US012645497B2

(12) United States Patent
Chatterjee et al.

(10) Patent No.: US 12,645,497 B2
(45) Date of Patent: Jun. 2, 2026

(54) ELEVATED ISOLATION OF RECONFIGURABLE DATA FLOW RESOURCES IN CLOUD COMPUTING

(71) Applicant: SambaNova Systems, Inc., Palo Alto, CA (US)

(72) Inventors: Ranen Chatterjee, Palo Alto, CA (US); Ravinder Kumar, Palo Alto, CA (US); Raghunath Shenbagam, San Jose, CA (US); Maran Wilson, Palo Alto, CA (US); Conrad Alexander Turlik, Palo Alto, CA (US); Arnav Goel, Palo Alto, CA (US); Arjun Sabnis, Palo Alto, CA (US); Yannan Chen, Palo Alto, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 634 days.

(21) Appl. No.: 18/084,013

(22) Filed: Dec. 19, 2022

(65) Prior Publication Data

US 2023/0205585 A1    Jun. 29, 2023

Related U.S. Application Data

(60) Provisional application No. 63/293,456, filed on Dec. 23, 2021.

(51) Int. Cl.
| | |
|---|---|
| *G06F 9/46* | (2006.01) |
| *G06F 9/50* | (2006.01) |
| *G06F 9/54* | (2006.01) |

(52) U.S. Cl.
CPC ........... *G06F 9/5016* (2013.01); *G06F 9/544* (2013.01); *G06F 9/545* (2013.01); *G06F 2209/5011* (2013.01)

(58) Field of Classification Search
None
See application file for complete search history.

(56) References Cited

U.S. PATENT DOCUMENTS

| | | | | |
|---|---|---|---|---|
| 10,846,117 | B1 * | 11/2020 | Steinberg | ................ G06F 21/56 |
| 11,579,925 | B2 * | 2/2023 | Duluk, Jr. | ............. G06F 9/5044 |

* cited by examiner

*Primary Examiner* — Bing Zhao
(74) *Attorney, Agent, or Firm* — FP; Sikander M. Khan; Joachim Erhard Pistorius

(57) ABSTRACT

A data processing system includes a runtime processor and a pool of reconfigurable data flow resources with memory units, busses, and arrays of physical configurable units. The runtime processor is operatively coupled to the pool of reconfigurable data flow resources and configured to load first and second configuration files for executing first and second user applications on first and second subsets of the arrays of physical configurable units and to assign first and second subsets of the memory units to the first and second user applications. The runtime processor starts execution of the first and second user applications on the first and second subsets of the arrays of physical configurable units, prevents the first user application from accessing the resources allocated to the second user application, and prevents the second user application from accessing resources allocated to the first user application.

19 Claims, 18 Drawing Sheets

200

1700

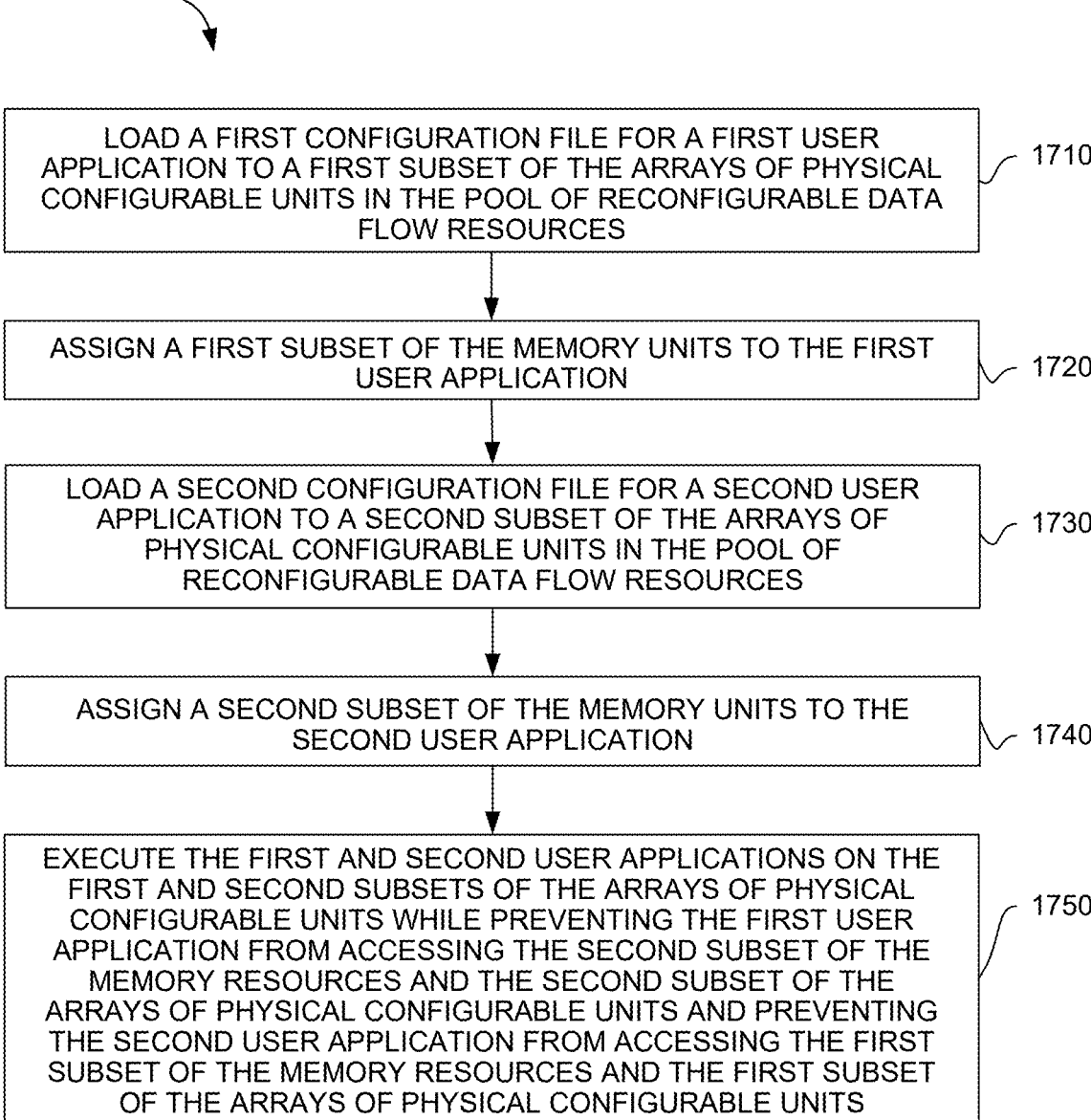

LOAD A FIRST CONFIGURATION FILE FOR A FIRST USER APPLICATION TO A FIRST SUBSET OF THE ARRAYS OF PHYSICAL CONFIGURABLE UNITS IN THE POOL OF RECONFIGURABLE DATA FLOW RESOURCES — 1710

ASSIGN A FIRST SUBSET OF THE MEMORY UNITS TO THE FIRST USER APPLICATION — 1720

LOAD A SECOND CONFIGURATION FILE FOR A SECOND USER APPLICATION TO A SECOND SUBSET OF THE ARRAYS OF PHYSICAL CONFIGURABLE UNITS IN THE POOL OF RECONFIGURABLE DATA FLOW RESOURCES — 1730

ASSIGN A SECOND SUBSET OF THE MEMORY UNITS TO THE SECOND USER APPLICATION — 1740

EXECUTE THE FIRST AND SECOND USER APPLICATIONS ON THE FIRST AND SECOND SUBSETS OF THE ARRAYS OF PHYSICAL CONFIGURABLE UNITS WHILE PREVENTING THE FIRST USER APPLICATION FROM ACCESSING THE SECOND SUBSET OF THE MEMORY RESOURCES AND THE SECOND SUBSET OF THE ARRAYS OF PHYSICAL CONFIGURABLE UNITS AND PREVENTING THE SECOND USER APPLICATION FROM ACCESSING THE FIRST SUBSET OF THE MEMORY RESOURCES AND THE FIRST SUBSET OF THE ARRAYS OF PHYSICAL CONFIGURABLE UNITS — 1750

FIG. 17

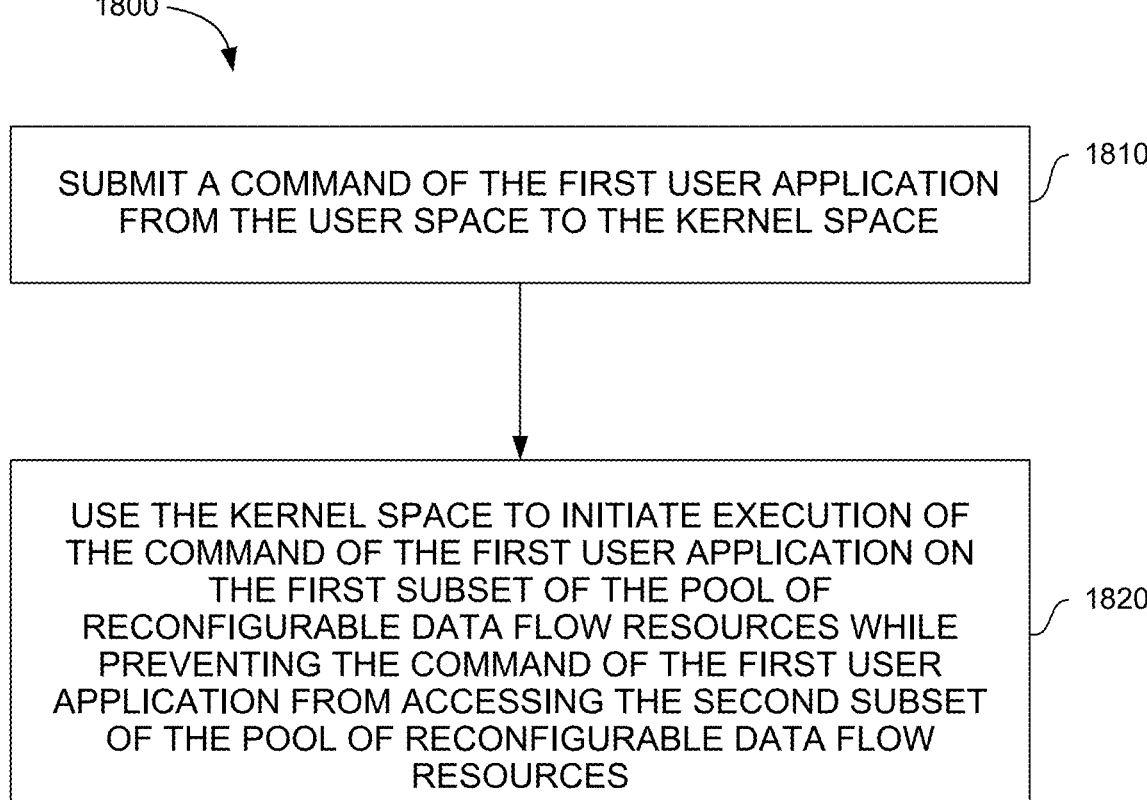

1800

SUBMIT A COMMAND OF THE FIRST USER APPLICATION
FROM THE USER SPACE TO THE KERNEL SPACE                1810

USE THE KERNEL SPACE TO INITIATE EXECUTION OF
THE COMMAND OF THE FIRST USER APPLICATION ON
THE FIRST SUBSET OF THE POOL OF
RECONFIGURABLE DATA FLOW RESOURCES WHILE          1820
PREVENTING THE COMMAND OF THE FIRST USER
APPLICATION FROM ACCESSING THE SECOND SUBSET
OF THE POOL OF RECONFIGURABLE DATA FLOW
RESOURCES

FIG. 18

ELEVATED ISOLATION OF RECONFIGURABLE DATA FLOW RESOURCES IN CLOUD COMPUTING

RELATED APPLICATIONS AND DOCUMENTS

This application claims the benefit of U.S. Provisional Patent Application No. 63/293,456, entitled, "Elevated Isolation of Reconfigurable Data Flow Resources in Cloud Computing" filed on 23 Dec. 2021. The provisional application is hereby incorporated by reference for all purposes.

This application also is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/239, 252, filed Jan. 3, 2019, entitled "VIRTUALIZATION OF A RECONFIGURABLE DATA PROCESSOR,";

U.S. Nonprovisional patent application Ser. No. 16/862, 445, filed Apr. 29, 2020, entitled "VIRTUALIZATION OF A RECONFIGURABLE DATA PROCESSOR,";

U.S. Nonprovisional patent application Ser. No. 16/197, 826, filed Nov. 21, 2018, entitled "CONFIGURATION LOAD OF A RECONFIGURABLE DATA PROCESSOR,";

U.S. Nonprovisional patent application Ser. No. 16/198, 086, filed Nov. 21, 2018, entitled "CONFIGURATION UNLOAD OF A RECONFIGURABLE DATA PROCESSOR,";

U.S. Nonprovisional patent application Ser. No. 17/093, 543, filed Nov. 9, 2020, entitled "EFFICIENT CONFIGURATION OF A RECONFIGURABLE DATA PROCESSOR,";

U.S. Nonprovisional patent application Ser. No. 16/260, 548, filed Jan. 29, 2019, entitled "MATRIX NORMAL/ TRANSPOSE READ AND A RECONFIGURABLE DATA PROCESSOR INCLUDING SAME,";

U.S. Nonprovisional patent application Ser. No. 16/536, 192, filed Aug. 8, 2019, entitled "COMPILER FLOW LOGIC FOR RECONFIGURABLE ARCHITECTURES,";

U.S. Nonprovisional patent application Ser. No. 17/326, 128, filed May 20, 2021, entitled "COMPILER FLOW LOGIC FOR RECONFIGURABLE ARCHITECTURES,";

U.S. Nonprovisional patent application Ser. No. 16/407, 675, filed May 9, 2019, entitled "CONTROL FLOW BARRIER AND RECONFIGURABLE DATA PROCESSOR,";

U.S. Nonprovisional patent application Ser. No. 16/504, 627, filed Jul. 8, 2019, entitled "QUIESCE RECONFIGURABLE DATA PROCESSOR,";

U.S. Nonprovisional patent application Ser. No. 17/322, 697, filed May 17, 2021, entitled "QUIESCE RECONFIGURABLE DATA PROCESSOR,";

U.S. Nonprovisional patent application Ser. No. 16/572, 516, filed Sep. 16, 2019, entitled "EFFICIENT EXECUTION OF OPERATION UNIT GRAPHS ON RECONFIGURABLE ARCHITECTURES BASED ON USER SPECIFICATION,";

U.S. Nonprovisional patent application Ser. No. 16/744, 077, filed Jan. 15, 2020, entitled "COMPUTATIONALLY EFFICIENT SOFTMAX LOSS GRADIENT BACKPROPAGATION,";

U.S. Nonprovisional patent application Ser. No. 16/590, 058, filed Oct. 1, 2019, entitled "COMPUTATION UNITS FOR FUNCTIONS BASED ON LOOKUP TABLES,";

U.S. Nonprovisional patent application Ser. No. 16/695, 138, filed Nov. 25, 2019, entitled "COMPUTATIONAL UNITS FOR BATCH NORMALIZATION,";

U.S. Nonprovisional patent application Ser. No. 16/688, 069, filed Nov. 19, 2019, entitled "LOOK-UP TABLE WITH INPUT OFFSETTING,";

U.S. Nonprovisional patent application Ser. No. 16/718, 094, filed Dec. 17, 2019, entitled "COMPUTATIONAL UNITS FOR ELEMENT APPROXIMATION,";

U.S. Nonprovisional patent application Ser. No. 16/560, 057, filed Sep. 4, 2019, entitled "SIGMOID FUNCTION IN HARDWARE AND A RECONFIGURABLE DATA PROCESSOR INCLUDING SAME,";

U.S. Nonprovisional patent application Ser. No. 16/572, 527, filed Sep. 16, 2019, entitled "Performance Estimation-Based Resource Allocation for Reconfigurable Architectures,";

U.S. Nonprovisional patent application Ser. No. 15/930, 381, filed May 12, 2020, entitled "COMPUTATIONALLY EFFICIENT GENERAL MATRIX-MATRIX MULTIPLICATION (GEMM),";

U.S. Nonprovisional patent application Ser. No. 17/337, 080, filed Jun. 2, 2021, entitled "MEMORY EFFICIENT DROPOUT,";

U.S. Nonprovisional patent application Ser. No. 17/337, 126, filed Jun. 2, 2021, entitled "MEMORY EFFICIENT DROPOUT, WITH REORDERING OF DROPOUT MASK ELEMENTS,";

U.S. Nonprovisional patent application Ser. No. 16/890, 841, filed Jun. 2, 2020, entitled "ANTI-CONGESTION FLOW CONTROL FOR RECONFIGURABLE PROCESSORS,";

U.S. Nonprovisional patent application Ser. No. 17/023, 015, filed Sep. 16, 2020, entitled "COMPILE TIME LOGIC FOR DETECTING STREAMING COMPATIBLE AND BROADCAST COMPATIBLE DATA ACCESS PATTERNS,";

U.S. Nonprovisional patent application Ser. No. 17/031, 679, filed Sep. 24, 2020, entitled "SYSTEMS AND METHODS FOR MEMORY LAYOUT DETERMINATION AND CONFLICT RESOLUTION,";

U.S. Nonprovisional patent application Ser. No. 17/175, 289, filed Feb. 12, 2021, entitled "INSTRUMENTATION PROFILING FOR RECONFIGURABLE PROCESSORS,";

U.S. Nonprovisional patent application Ser. No. 17/371, 049, filed Jul. 8, 2021, entitled "SYSTEMS AND METHODS FOR EDITING TOPOLOGY OF A RECONFIGURABLE DATA PROCESSOR,";

U.S. Nonprovisional patent application Ser. No. 16/922, 975, filed Jul. 7, 2020, entitled "RUNTIME VIRTUALIZATION OF RECONFIGURABLE DATA FLOW RESOURCES,";

U.S. Nonprovisional patent application Ser. No. 16/996, 666, filed Aug. 18, 2020, entitled "RUNTIME PATCHING OF CONFIGURATION FILES,";

U.S. Nonprovisional patent application Ser. No. 17/214, 768, filed Mar. 26, 2021, entitled "RESOURCE ALLO-CATION FOR RECONFIGURABLE PROCESSORS,";

U.S. Nonprovisional patent application Ser. No. 17/127, 818, filed Dec. 18, 2020, entitled "INTRA-NODE BUFFER-BASED STREAMING FOR RECONFIG-URABLE PROCESSOR-AS-A-SERVICE (RPAAS),";

U.S. Nonprovisional patent application Ser. No. 17/127, 929, filed Dec. 18, 2020, entitled "INTER-NODE BUFFER-BASED STREAMING FOR RECONFIG-URABLE PROCESSOR-AS-A-SERVICE (RPAAS),";

U.S. Nonprovisional patent application Ser. No. 17/185, 264, filed Feb. 25, 2021, entitled "TIME-MULTI-PLEXED USE OF RECONFIGURABLE HARD-WARE,";

U.S. Nonprovisional patent application Ser. No. 17/216, 647, filed Mar. 29, 2021, entitled "TENSOR PARTI-TIONING AND PARTITION ACCESS ORDER,";

U.S. Nonprovisional patent application Ser. No. 17/216, 650, filed Mar. 29, 2021, entitled "MULTI-HEADED MULTI-BUFFER FOR BUFFERING DATA FOR PROCESSING,";

U.S. Nonprovisional patent application Ser. No. 17/216, 657, filed Mar. 29, 2021, entitled "LOSSLESS TILING IN CONVOLUTION NETWORKS—PADDING BEFORE TILING, LOCATION-BASED TILING, AND ZEROING-OUT,";

U.S. Nonprovisional patent application Ser. No. 17/384, 515, filed Jul. 23, 2021, entitled "LOSSLESS TILING IN CONVOLUTION NETWORKS—MATERIAL-IZATION OF TENSORS,";

U.S. Nonprovisional patent application Ser. No. 17/216, 651, filed Mar. 29, 2021, entitled "LOSSLESS TILING IN CONVOLUTION NETWORKS—TILING CON-FIGURATION,";

U.S. Nonprovisional patent application Ser. No. 17/216, 652, filed Mar. 29, 2021, entitled "LOSSLESS TILING IN CONVOLUTION NETWORKS—SECTION BOUNDARIES,";

U.S. Nonprovisional patent application Ser. No. 17/216, 654, filed Mar. 29, 2021, entitled "LOSSLESS TILING IN CONVOLUTION NETWORKS—READ-MODIFY-WRITE IN BACKWARD PASS,";

U.S. Nonprovisional patent application Ser. No. 17/216, 655, filed Mar. 29, 2021, entitled "LOSSLESS TILING IN CONVOLUTION NETWORKS—WEIGHT GRA-DIENT CALCULATION,";

U.S. Nonprovisional patent application Ser. No. 17/364, 110, filed Jun. 30, 2021, entitled "LOSSLESS TILING IN CONVOLUTION NETWORKS—TILING CON-FIGURATION FOR A SEQUENCE OF SECTIONS OF A GRAPH,";

U.S. Nonprovisional patent application Ser. No. 17/364, 129, filed Jun. 30, 2021, entitled "LOSSLESS TILING IN CONVOLUTION NETWORKS—TILING CON-FIGURATION BETWEEN TWO SECTIONS,";

"U.S. Nonprovisional patent application Ser. No. 17/364, 141, filed Jun. 30, 2021, entitled ""LOSSLESS TIL-ING IN CONVOLUTION NETWORKS—PADDING AND RE-TILING AT SECTION BOUNDARIES,"";

U.S. Nonprovisional patent application Ser. No. 17/384, 507, filed Jul. 23, 2021, entitled "LOSSLESS TILING IN CONVOLUTION NETWORKS—BACKWARD PASS,";

U.S. Provisional Patent Application No. 63/107,413, filed Oct. 29, 2020, entitled "SCANNABLE LATCH

4

ARRAY FOR STRUCTURAL TEST AND SILICON DEBUG VIA SCANDUMP,";

U.S. Provisional Patent Application No. 63/165,073, filed Mar. 23, 2021, entitled "FLOATING POINT MULTI-PLY-ADD, ACCUMULATE UNIT WITH CARRY-SAVE ACCUMULATOR IN BF16 AND FLP32 FOR-MAT,";

U.S. Provisional Patent Application No. 63/166,221, filed Mar. 25, 2021, entitled "LEADING ZERO AND LEADING ONE DETECTOR PREDICTOR SUIT-ABLE FOR CARRY-SAVE FORMAT,";

U.S. Provisional Patent Application No. 63/190,749, filed May 19, 2021, entitled "FLOATING POINT MULTI-PLY-ADD, ACCUMULATE UNIT WITH CARRY-SAVE ACCUMULATOR,";

U.S. Provisional Patent Application No. 63/174,460, filed Apr. 13, 2021, entitled "EXCEPTION PROCESSING IN CARRY-SAVE ACCUMULATION UNIT FOR MACHINE LEARNING,";

U.S. Nonprovisional patent application Ser. No. 17/397, 241, filed Aug. 9, 2021, entitled "FLOATING POINT MULTIPLY-ADD, ACCUMULATE UNIT WITH CARRY-SAVE ACCUMULATOR,";

U.S. Nonprovisional patent application Ser. No. 17/216, 509, filed Mar. 29, 2021, entitled "UNIVERSAL RAIL KIT,";

U.S. Nonprovisional patent application Ser. No. 17/379, 921, filed Jul. 19, 2021, entitled "DATAFLOW FUNC-TION OFFLOAD TO RECONFIGURABLE PRO-CESSORS,";

U.S. Nonprovisional patent application Ser. No. 17/379, 924, filed Jul. 19, 2021, entitled "DATAFLOW ALL-REDUCE FOR RECONFIGURABLE PROCESSOR SYSTEMS,";

U.S. Nonprovisional patent application Ser. No. 17/378, 342, filed Jul. 16, 2021, entitled "DEFECT REPAIR FOR A RECONFIGURABLE DATA PROCESSOR,";

U.S. Nonprovisional patent application Ser. No. 17/378, 391, filed Jul. 16, 2021, entitled "DEFECT REPAIR CIRCUITS FOR A RECONFIGURABLE DATA PRO-CESSOR,";

U.S. Nonprovisional patent application Ser. No. 17/378, 399, filed Jul. 16, 2021, entitled "ROUTING CIR-CUITS FOR DEFECT REPAIR FOR A RECONFIG-URABLE DATA PROCESSOR,";

U.S. Provisional Patent Application No. 63/220,266, filed Jul. 9, 2021, entitled "LOGIC BIST AND FUNC-TIONAL TEST FOR A CGRA,";

U.S. Provisional Patent Application No. 63/195,664, filed Jun. 1, 2021, entitled "VARIATION-TOLERANT VARIABLE-LENGTH CLOCK-STRETCHER MOD-ULE WITH IN-SITU END-OF-CHAIN DETECTION MECHANISM,";

U.S. Nonprovisional patent application Ser. No. 17/338, 620, filed Jun. 3, 2021, entitled "VARIABLE-LENGTH CLOCK STRETCHER WITH CORREC-TION FOR GLITCHES DUE TO FINITE DLL BANDWIDTH,";

U.S. Nonprovisional patent application Ser. No. 17/338, 625, filed Jun. 3, 2021, entitled "VARIABLE-LENGTH CLOCK STRETCHER WITH CORREC-TION FOR GLITCHES DUE TO PHASE DETECTOR OFFSET,";

U.S. Nonprovisional patent application Ser. No. 17/338, 626, filed Jun. 3, 2021, entitled "VARIABLE-LENGTH CLOCK STRETCHER WITH CORREC-TION FOR DIGITAL DLL GLITCHES,";

U.S. Nonprovisional patent application Ser. No. 17/338, 629, filed Jun. 3, 2021, entitled "VARIABLE-LENGTH CLOCK STRETCHER WITH PASSIVE MODE JITTER REDUCTION,";

U.S. Nonprovisional patent application Ser. No. 17/405, 913, filed Aug. 18, 2021, entitled "VARIABLE-LENGTH CLOCK STRETCHER WITH COMBINER TIMING LOGIC,";

U.S. Provisional Patent Application No. 63/230,782, filed Aug. 8, 2021, entitled "LOW-LATENCY MASTER-SLAVE CLOCKED STORAGE ELEMENT,";

U.S. Provisional Patent Application No. 63/236,218, filed Aug. 23, 2021, entitled "SWITCH FOR A RECON-FIGURABLE DATAFLOW PROCESSOR,";

U.S. Provisional Patent Application No. 63/236,214, filed Aug. 23, 2021, entitled "SPARSE MATRIX MULTI-PLIER,".

All of the related application(s) and documents listed above are hereby incorporated by reference herein for all purposes.

FIELD OF THE TECHNOLOGY DISCLOSED

The present technology relates to a data processing system, and more particularly, to a data processing system that includes a pool of reconfigurable data flow resources having memory units, busses, and arrays of physical configurable units and a runtime processor that is operatively coupled to the pool of reconfigurable data flow resources and configured to execute first and second user applications on the pool of reconfigurable data flow resources. The runtime processor is particularly configured to execute first and second user applications on a pool of reconfigurable data flow resources that include coarse-grained reconfigurable processors in the cloud. Furthermore, the technology disclosed relates to a method of operating a data processing system is presented. The data processing system includes a pool of reconfigurable data flow resources that comprises arrays of physical configurable units, memory units, and busses coupled between the memory units and the arrays of physical configurable units; and a runtime processor that is operatively coupled to the pool of reconfigurable data flow resources. The technology disclosed also relates to a method of operating a runtime processor that includes a user space and a kernel space for executing first and second user applications on respective first and second subsets of a pool of reconfigurable data flow resources.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Virtualization has enabled the efficient scaling and sharing of compute resources in the cloud, adapting to changing user needs at runtime. Users are offered a view of an application service with management of resources hidden from view, or alternatively abstracted development platforms for deploying applications that can adapt to changing needs. The flexibility, scalability, and affordability offered by cloud computing are fundamental to the massively connected compute paradigm of the future.

As applications are migrating to the cloud in search of scalability, resilience, and cost-efficiency, silicon scaling has stalled, precipitating a wave of new specialized hardware accelerators such as tensor processing units (TPUs) and intelligence processing units (IPUs). Hardware accelerators have driven the success of emerging application domains in the cloud, but cloud computing and hardware specialization are on a collision course.

In recent years, reconfigurable processors have emerged as a contender for cloud accelerators, combining significant computational capabilities with an architecture more amenable to virtualization, and a lower power footprint. A key strength of reconfigurable processors is the ability to modify their operation at runtime, as well as the ease with which they can be safely partitioned for sharing. Reconfigurable processors, including FPGAs, can be configured to implement a variety of functions more efficiently or faster than might be achieved using a general-purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of low-latency and energy-efficient accelerators for machine learning and artificial intelligence workloads.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 17 is a diagram of a flowchart showing illustrative operations that a runtime processor may perform for executing two user applications on a pool of reconfigurable data flow resources in a data processing system.

FIG. 18 is a diagram of a flowchart showing illustrative operations that a runtime processor may perform during the execution of first and second user applications on respective first and second subsets of a pool of reconfigurable data flow resources.

DETAILED DESCRIPTION

Figure 1:
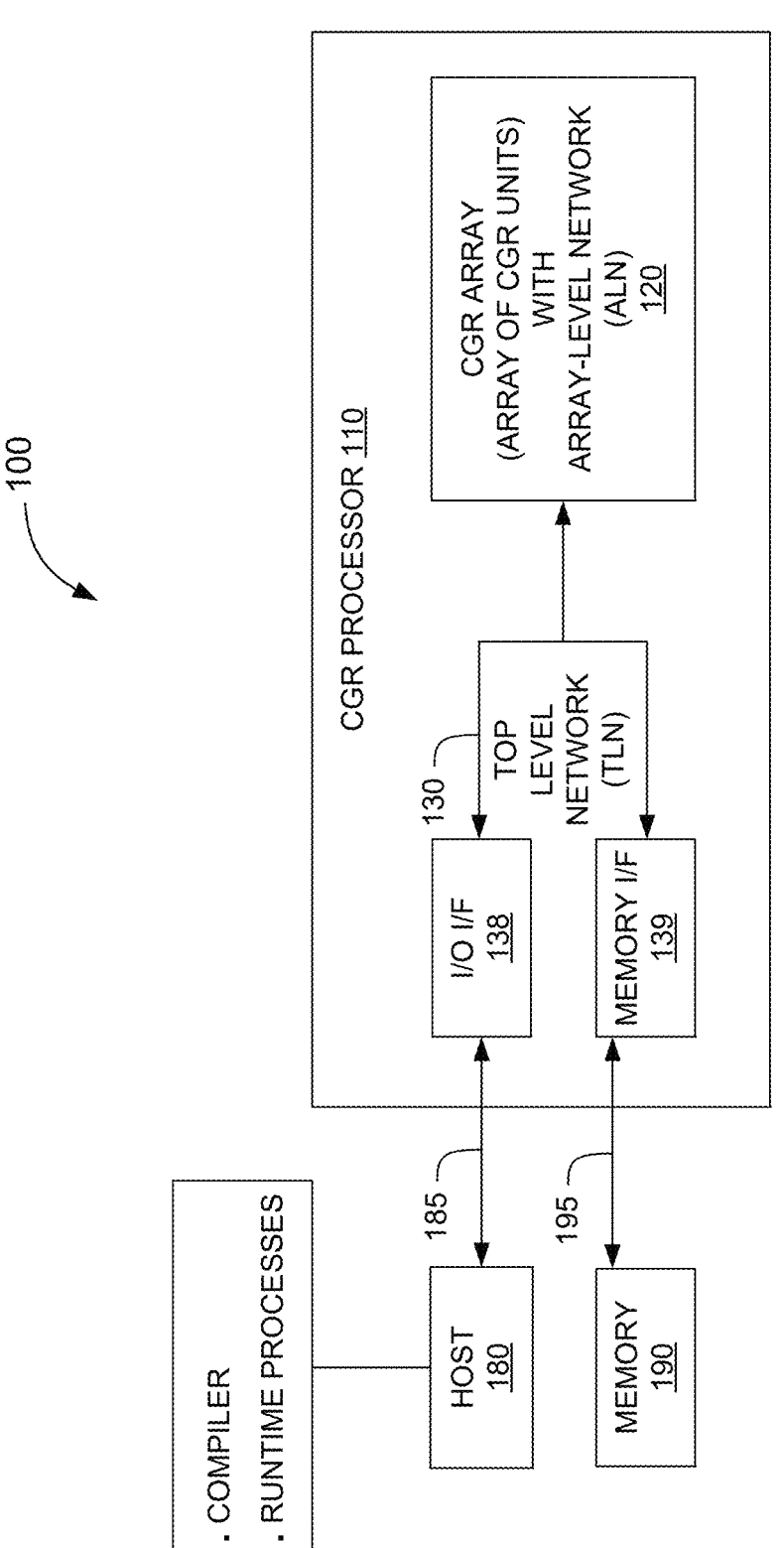
FIG. 1 is a diagram of an illustrative data processing system including a pool of reconfigurable data flow resources and a runtime processor.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

As deep learning accelerators, reconfigurable processors are optimized to provide high performance for single-task and static-workload scenarios, which conflict with the multi-tenancy and dynamic resource allocation requirements of cloud computing.

Cloud applications typically run on virtual infrastructure, but practical virtualization support for accelerators has yet to arrive. Cloud providers routinely support accelerators but do so using peripheral component interconnect express (PCIe) pass-through techniques that dedicate physical hardware to virtual machines (VMs). Multi-tenancy and consolidation are lost as a consequence, which leads to hardware under-utilization.

In fact, practical virtualization should support sharing and isolation under flexible policy with minimal overhead. The structure of accelerator stacks makes this combination extremely difficult to achieve. Historically, accelerator stacks are silos comprising proprietary layers communicating through memory mapped interfaces. This opaque organization makes it impractical to interpose intermediate layers to form an efficient and compatible virtualization boundary. The remaining interposable interfaces leave designers with untenable alternatives that sacrifice critical virtualization properties such as interposition and compatibility.

It is desirable therefore to provide virtualized reconfigurable processors that support multi-client and dynamic-workload scenarios in the cloud. Runtime support for better virtualization of reconfigurable processors is desirable that supports sharing and isolation with minimal overhead.

A technology is described which enables the execution of two applications on reconfigurable data flow resources in a pool of such reconfigurable data flow resources while ensuring isolation between the two applications.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

High-level programs for machine learning (ML) and artificial intelligence (AI) may require massively parallel computations, where many parallel and interdependent threads (meta-pipelines) exchange data. Such programs are ill-suited for execution on Von Neumann computers. They require architectures that are optimized for parallel processing, such as coarse-grained reconfigurable architectures (CGRAs) or graphic processing units (GPUs). The ascent of ML, AI, and massively parallel architectures places new requirements on compilers, including how computation graphs, and in particular data flow graphs, are pipelined, which operations are assigned to which compute units, how data is routed between various compute units and memory, and how synchronization is controlled, particularly when a data flow graph includes one or more nested loops, whose execution time varies dependent on the data being processed.

The architecture, configurability, and data flow capabilities of an array of coarse-grained reconfigurable (CGR) units enable increased compute power that supports both parallel and pipelined computation. A CGR processor, which includes one or more CGR arrays (arrays of CGR units), can be programmed to simultaneously execute multiple independent and interdependent data flow graphs. To enable simultaneous execution, the data flow graphs may be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL.

Translation of high-level programs to executable bit files is performed by a compiler. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or data flow graphs). This requirement implies that a compiler for a CGRA must decide which operation of a computation graph or data flow graph is assigned to which of the CGR units, and how both data and, related to the support of data flow graphs, control information flows among CGR units, and to and from external hosts and storage. This process, known as "place and route", is one of many new challenges posed to compilers for arrays of CGR units.

FIG. 1 illustrates an example system 100 including a CGR processor 110, a host 180, and a memory 190. As shown, CGR processor 110 has a coarse-grained reconfigurable architecture (CGRA) and includes an array of CGR units 120 such as a CGR array. CGR processor 110 may include an IO interface 138 and a memory interface 139. Array of CGR units 120 may be coupled with IO interface 138 and memory interface 139 via databus 130 which may be part of a top-level network (TLN). Host 180 communicates with IO interface 138 via system databus 185, and memory interface 139 communicates with memory 190 via memory bus 195.

Array of CGR units 120 may further include compute units and memory units that are interconnected with an array-level network (ALN) to provide the circuitry for execution of a computation graph or a data flow graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, data flow graphs, models, deep learning applications, deep learning neural networks, programs, program images, jobs, tasks and/or any other procedures and functions that may perform serial and/or parallel processing.

In some implementations, execution of the graph(s) may involve using more than one CGR processor 110. In some implementations, CGR processor 110 may include one or more arrays of CGR units 120.

Host 180 may be, or include, a computer such as further described with reference to FIG. 2. Host 180 runs runtime processes, as further referenced herein. Therefore, host 180 or portions of host 180 are sometimes also referred to as a runtime processor. In some implementations, host 180 may also be used to run computer programs, such as the compiler further described herein with reference to FIG. 6. In some implementations, the compiler may run on a computer that is similar to the computer described with reference to FIG. 2, but separate from host 180.

CGR processor 110 may accomplish computational tasks by executing a configuration file (e.g., a processor-executable format (PEF) file). For the purposes of this description, a configuration file corresponds to a data flow graph, or a translation of a data flow graph, and may further include initialization data. A compiler compiles the high-level program to provide the configuration file. In some implementations described herein, a CGR array 120 is configured by programming one or more configuration stores with all or parts of the configuration file. Therefore, the configuration file is sometimes also referred to as a programming file.

A single configuration store may be at the level of the CGR processor 110 or the CGR array 120, or a CGR unit may include an individual configuration store. The configuration file may include configuration data for the CGR array and CGR units in the CGR array, and link the computation graph to the CGR array. Execution of the configuration file by CGR processor 110 causes the CGR array(s) to implement the user algorithms and functions in the data flow graph.

CGR processor 110 can be implemented on a single integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
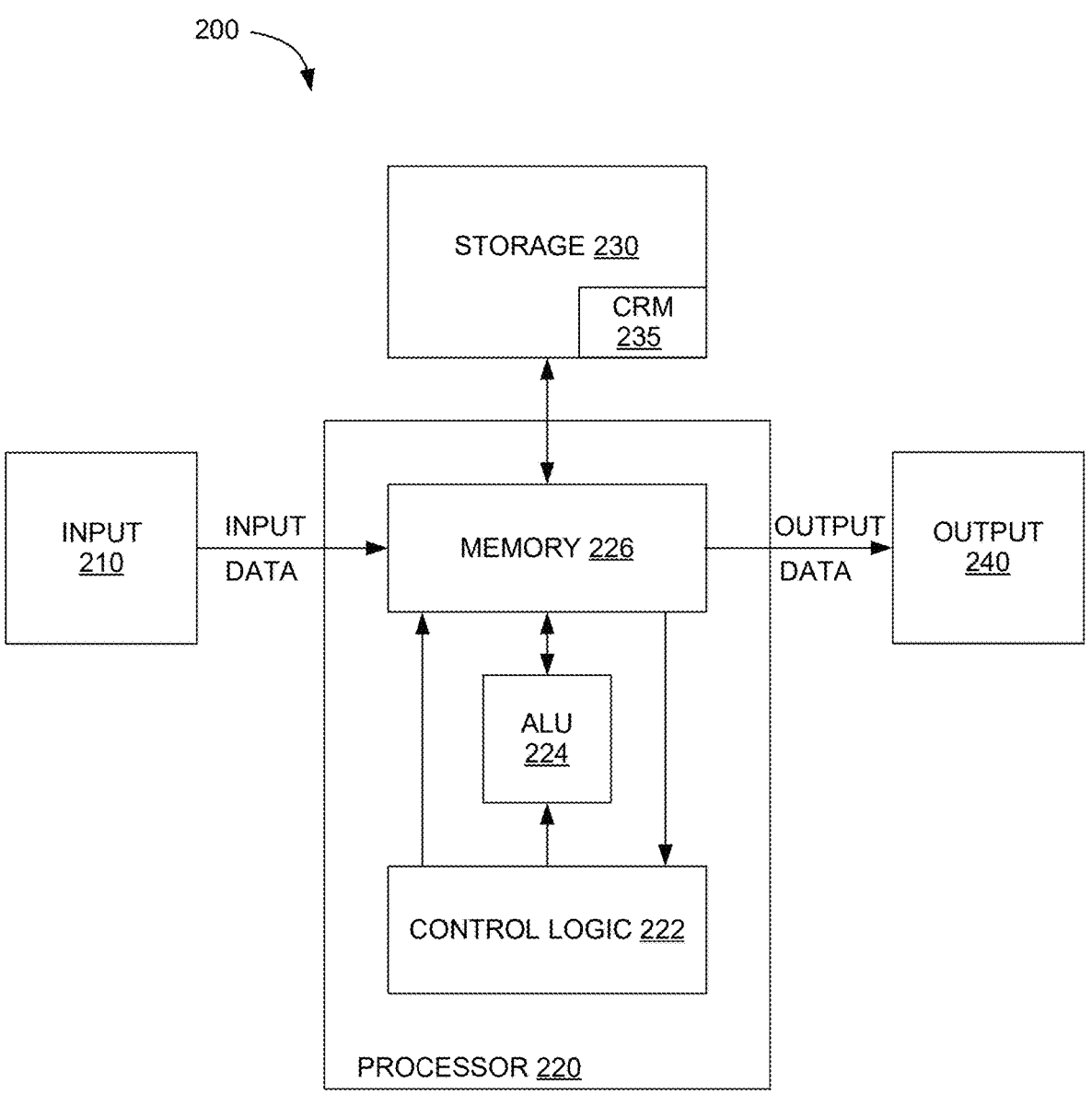
FIG. 2 is a diagram of an illustrative computer, including an input device, a processor, a storage device, and an output device.

FIG. 2 illustrates an example of a computer 200, including an input device 210, a processor 220, a storage device 230, and an output device 240. Although the example computer 200 is drawn with a single processor 220, other implementations may have multiple processors. Input device 210 may comprise a mouse, a keyboard, a sensor, an input port (e.g., a universal serial bus (USB) port), and/or any other input device known in the art. Output device 240 may comprise a monitor, printer, and/or any other output device known in the art. Illustratively, part or all of input device 210 and output device 240 may be combined in a network interface, such as a Peripheral Component Interconnect Express (PCIe) interface suitable for communicating with CGR processor 110 of FIG. 1.

Input device 210 is coupled with processor 220 to provide input data. If desired, memory 226 of processor 220 may store the input data. Processor 220 is coupled with output device 240. In some implementations, memory 226 may provide output data to output device 240.

Processor 220 further includes control logic 222 and arithmetic and logic unit (ALU) 224. Control logic 222 may be operable to control memory 226 and ALU 224. If desired, control logic 222 may be operable to receive program and configuration data from memory 226. Illustratively, control logic 222 may control exchange of data between memory 226 and storage device 230. Memory 226 may comprise memory with fast access, such as static random-access memory (SRAM). Storage device 230 may comprise memory with slow access, such as dynamic random-access memory (DRAM), flash memory, magnetic disks, optical disks, and/or any other memory type known in the art. At least a part of the memory in storage device 230 includes a non-transitory computer-readable medium (CRM 235), such as used for storing computer programs.

Figure 3:
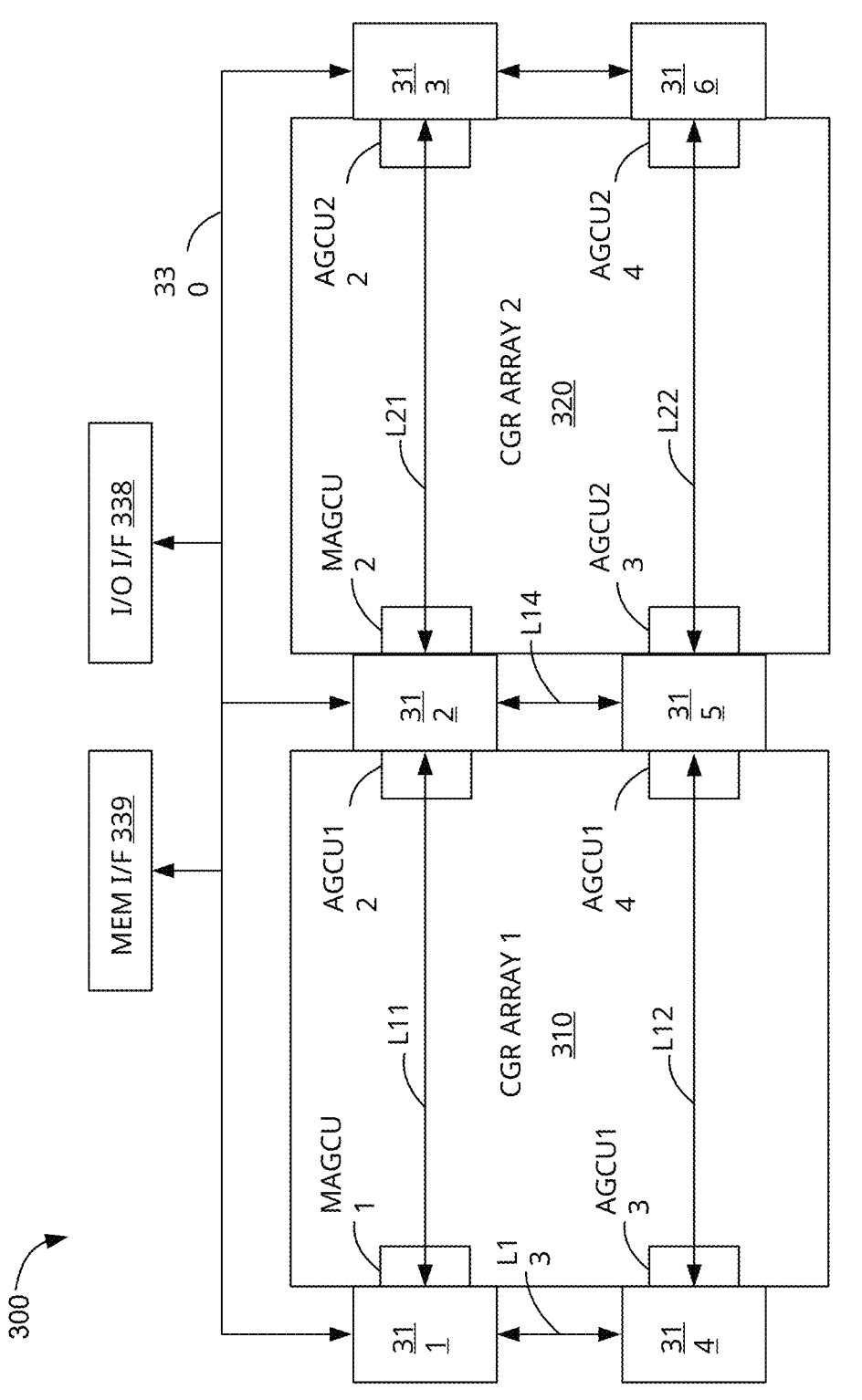
FIG. 3 is a diagram of an illustrative reconfigurable processor including a top-level network (TLN) and two reconfigurable data flow units (RDUs).

FIG. 3 illustrates example details of a CGR architecture 300 including a top-level network (TLN 330) and two CGR arrays (CGR array 310 and CGR array 320). A CGR array comprises an array of CGR units (e.g., pattern memory units (PMUs), pattern compute units (PCUs), fused-control memory units (FCMUs)) coupled via an array-level network (ALN), e.g., a bus system. The ALN may be coupled with the TLN 330 through several Address Generation and Coalescing Units (AGCUs), and consequently with input/output (I/O) interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN 330 and external devices, such as high-capacity memory, host processors, other CGR processors, FPGA devices, and so on, that may be coupled with the interfaces.

As shown in FIG. 3, each CGR array 310, 320 has four AGCUs (e.g., MAGCU1, AGCU12, AGCU13, and AGCU14 in CGR array 310). The AGCUs interface the TLN to the ALNs and route data from the TLN to the ALN or vice versa.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN 330 may be constructed using top-level switches (e.g., switch 311, switch 312, switch 313, switch 314, switch 315, and switch 316). If desired, the top-level switches may be coupled with at least one other top-level switch. At least some top-level switches may be connected with other circuits on the TLN, including the AGCUs, and external I/O interface 338.

Illustratively, the TLN 330 includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
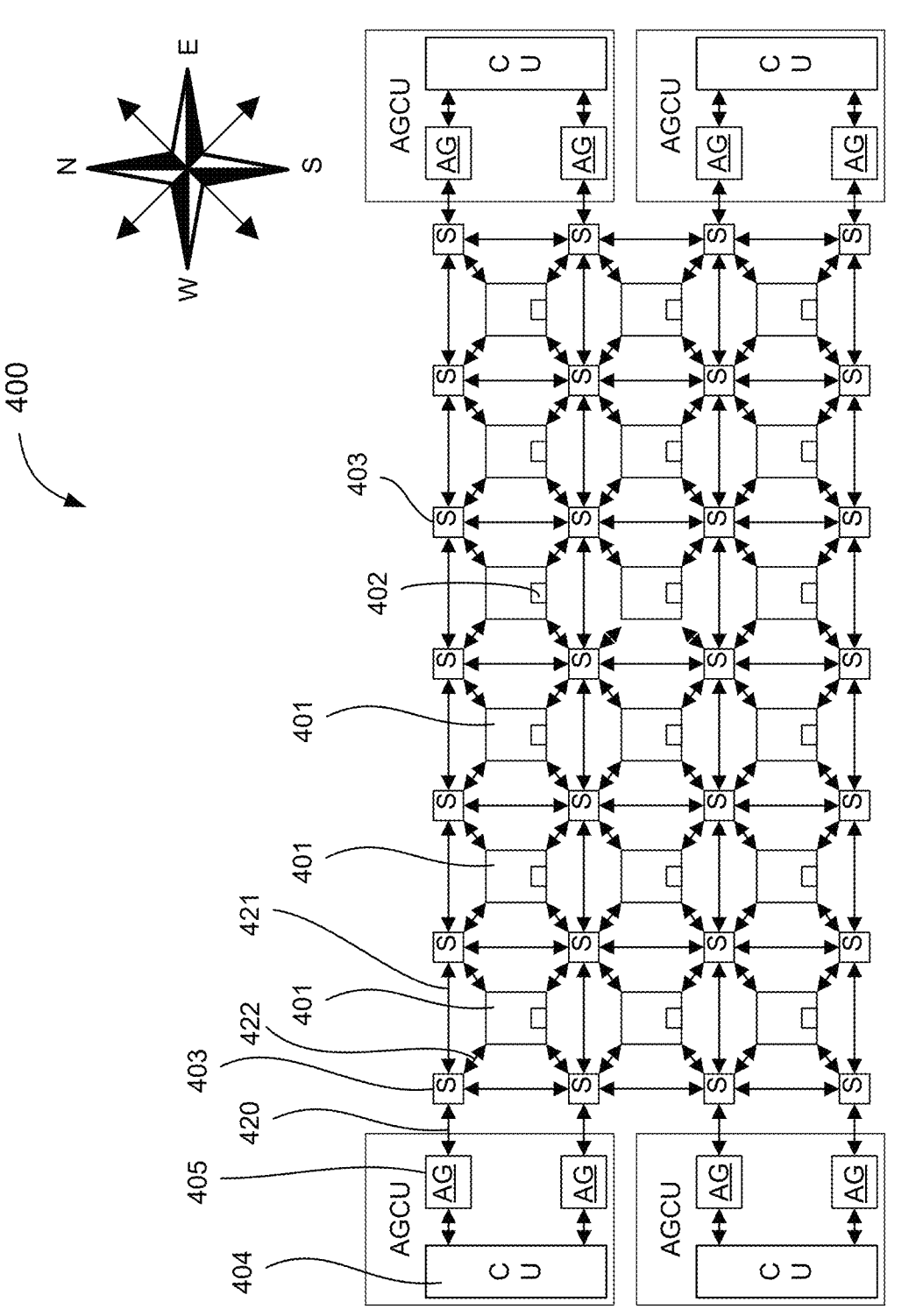
FIG. 4 is a diagram of an illustrative RDU, including an array of configurable units in an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017 Jun. 24-28, 2017, Toronto, ON, Canada.

Illustratively, each of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns.

The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections.

A configuration file may include configuration data representing an initial configuration, or starting state, of each of the CGR units 401 that execute a high-level program with user algorithms and functions. Program load is the process of setting up the configuration stores 402 in the CGR array 400 based on the configuration data to allow the CGR units 401 to execute the high-level program. Program load may also require loading memory units and/or PMUs.

In some implementations, a runtime processor (e.g., the portions of host 180 of FIG. 1 that execute runtime processes) may perform the program load.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403, as shown in the example of FIG. 4, may have eight interfaces. The North, South, East and West interfaces of a switch unit may be used for links between switch units 403 using interconnects 421. The Northeast, Southeast, Northwest and Southwest interfaces of a switch unit 403 may each be used to make a link with an FCMU, PCU or PMU instance 401 using one of the interconnects 422. Two switch units 403 in each CGR array quadrant have links to an AGCU using interconnects 420. The coalescing unit 404 of the AGCU arbitrates between the AGs 405 and processes memory requests. Each of the eight interfaces of a switch unit 403 can include a vector interface, a scalar interface, and a control interface to communicate with the vector network, the scalar network, and the control network. In other implementations, a switch unit 403 may have any number of interfaces.

During execution of a graph or subgraph in a CGR array 400 after configuration, data can be sent via one or more switch units 403 and one or more links 421 between the switch units to the CGR units 401 using the vector bus and vector interface(s) of the one or more switch units 403 on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
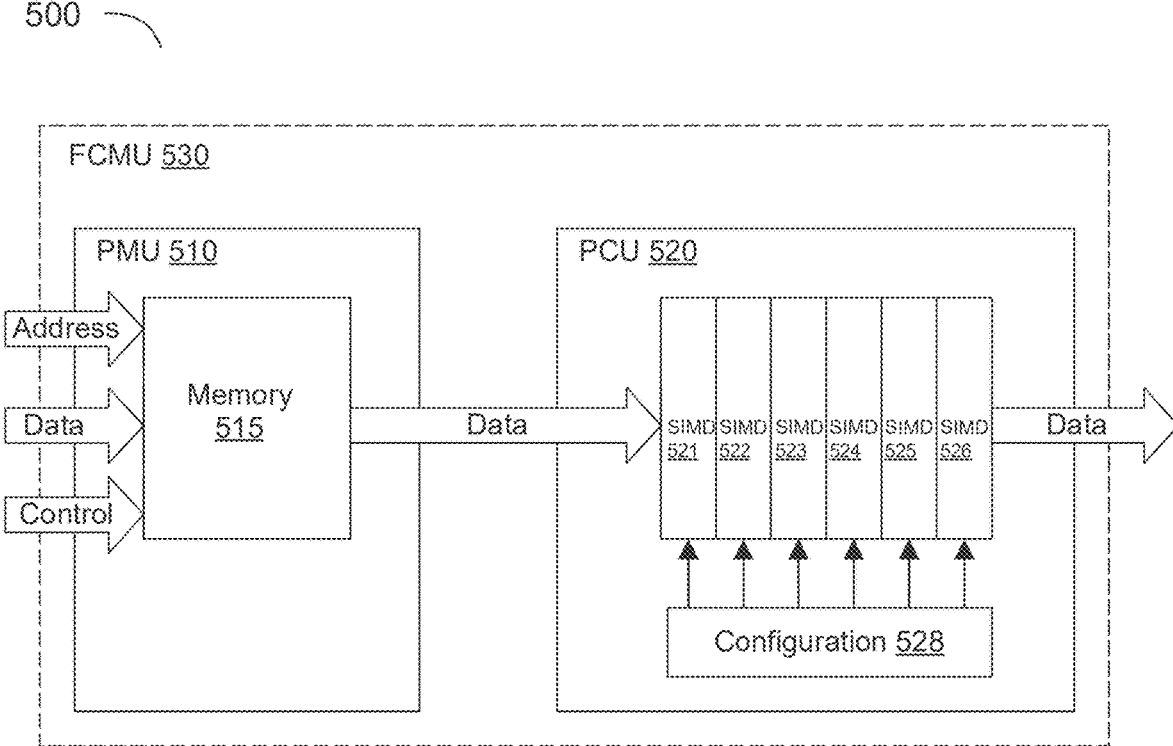
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. PMU 510 includes a scratchpad memory 515, which may receive external data, memory addresses, and memory control information (e.g., write enable, read enable) via one or more buses included in the ALN. PCU 520 includes two or more processor stages, such as SIMD 521 through SIMD 526, and configuration store 528. The processor stages may include ALUs, or SIMDs, as drawn, or any other reconfigurable stages that can process data.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
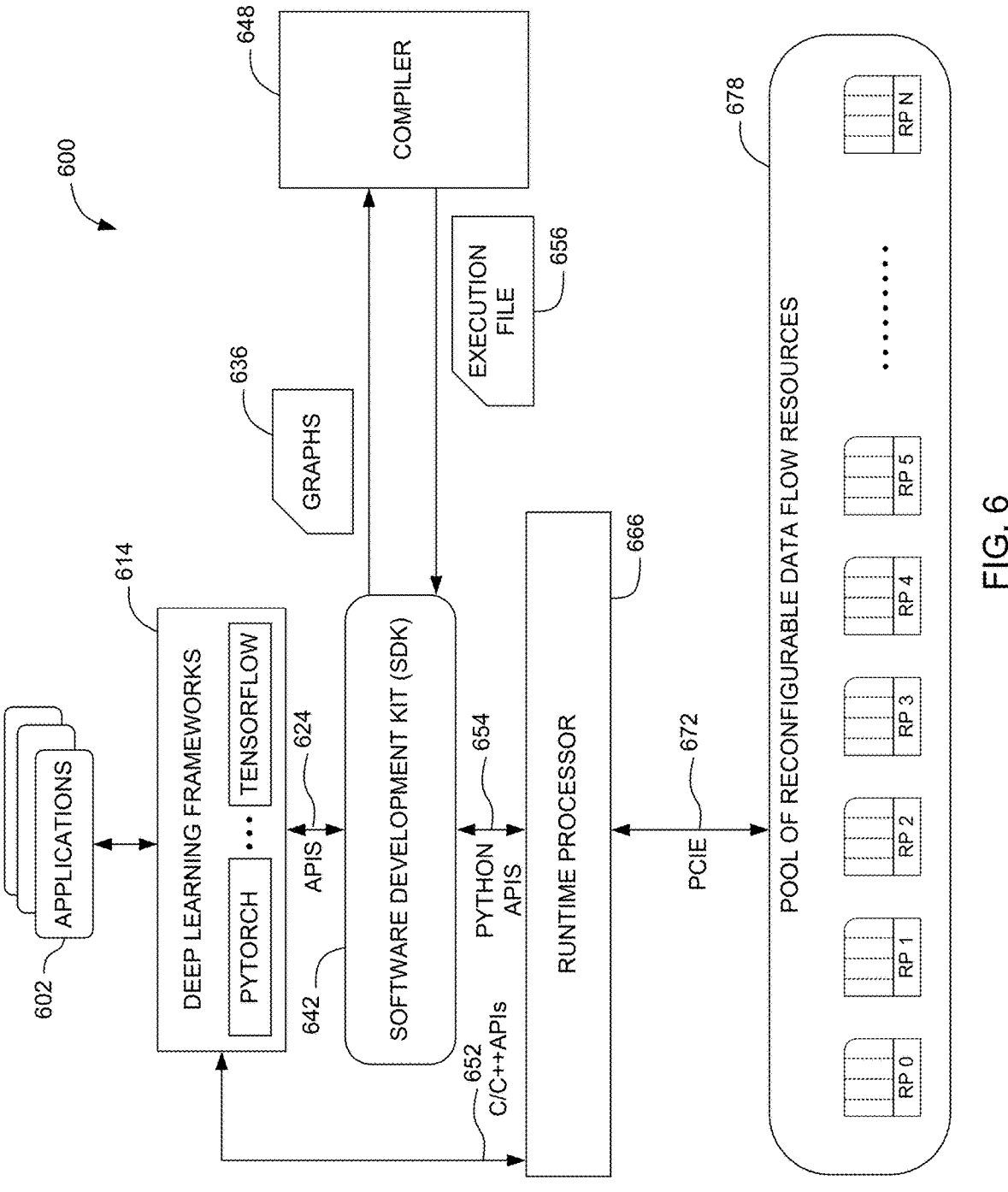
FIG. 6 is a diagram of an illustrative compute environment in which applications are provided a unified interface to a pool of reconfigurable data flow resources such that the pool of reconfigurable data flow resources is available to the applications as a single reconfigurable processor.

FIG. 6 shows a compute environment 600 that provides on-demand network access to a pool of reconfigurable data flow resources 678 that can be rapidly provisioned and released with minimal management effort or service provider interaction. The pool of reconfigurable data flow resources 678 includes memory units (e.g., memory 190 of FIG. 1), arrays of physical configurable units, and busses (e.g., memory bus 195 of FIG. 1 and/or TLN 330 of FIG. 3) that couple the arrays of physical configurable units and the memory units.

The busses or transfer resources enable the arrays of physical configurable units to receive and send data. Examples of the busses include peripheral component interface express (PCIe) channels, direct memory access (DMA) channels, double data-rate (DDR) channels, Ethernet channels, and InfiniBand channels. In some implementations, the busses include at least one of a DMA channel, a DDR channel, a PCIe channel, an Ethernet channel, or an Infini-Band channel.

The arrays of physical configurable units (e.g., compute units and memory units) are arranged in one or more reconfigurable processors (e.g., one or more of CGR processor 110 of FIG. 1) and may be coupled with each other in a programmable interconnect fabric (e.g., ALN 120 of FIG. 1). In some implementations, the arrays of physical configurable units are aggregated as a uniform pool of resources that are assigned to the execution of user applications.

The memory units of the pool of reconfigurable data flow resources 678 may be usable by the arrays of physical configurable units to store data. Examples of the memory units include main memory (e.g., off-chip/external dynamic random-access memory (DRAM)), local secondary storage (e.g., local disks (e.g., hard disk drive (HDD), solid-state drive (SSD))), and remote secondary storage (e.g., distributed file systems, web servers). Other examples of the memory units include PMUs, latches, registers, and caches (e.g., SRAM). In some implementations, the memory units include at least one of a DRAM, a HDD, a SSD, a distributed file system, or a web server.

The pool of reconfigurable data flow resources 678 is dynamically scalable to meet the performance objectives of applications 602 (or user applications 602). In some implementations, the applications 602 access the pool of reconfigurable data flow resources 678 over one or more networks (e.g., Internet).

The pool of reconfigurable data flow resources 678 may have different compute scales and hierarchies according to different implementations of the technology disclosed.

In one example, the pool of reconfigurable data flow resources 678 is a node (or a single machine) with arrays of physical configurable units that are arranged in a plurality of reconfigurable processors, supported by bus and memory units. The node also includes a host processor (e.g., CPU) that exchanges data with the plurality of reconfigurable processors, for example, over a PCIe interface. The host processor includes a runtime processor that manages resource allocation, memory mapping, and execution of the configuration files for applications requesting execution from the host processor.

In another example, the pool of reconfigurable data flow resources 678 is a rack (or cluster) of nodes, such that each node in the rack runs a respective plurality of reconfigurable processors, and includes a respective host processor configured with a respective runtime processor. The runtime processors are distributed across the nodes and communicate with each other so that they have unified access to the reconfigurable processors attached not just to their own node on which they run, but also to the reconfigurable processors attached to every other node in the data center.

The nodes in the rack are connected, for example, over Ethernet or InfiniBand (IB). In yet another example, the pool of reconfigurable data flow resources 678 is a pod that comprises a plurality of racks. In yet another example, the pool of reconfigurable data flow resources 678 is a superpod that comprises a plurality of pods. In yet another example, the pool of reconfigurable data flow resources 678 is a zone that comprises a plurality of superpods. In yet another example, the pool of reconfigurable data flow resources 678 is a data center that comprises a plurality of zones.

Users may execute applications 602 on the compute environment 600. Therefore, applications 602 are sometimes also referred to as user applications. The applications 602 are executed on the pool of reconfigurable data flow resources 678 in a distributed fashion by programming the individual compute and memory components to asynchronously receive, process, and send data and control information.

In the pool of reconfigurable data flow resources 678, computation can be executed as deep, nested data flow pipelines that exploit nested parallelism and data locality very efficiently. These data flow pipelines contain several stages of computation, where each stage reads data from one or more input buffers with an irregular memory access pattern, performs computations on the data while using one or more internal buffers or scratchpad memory to store and retrieve intermediate results, and produce outputs that are written to one or more output buffers. The structure of these pipelines depends on the control and data flow graph representing the application. Pipelines can be arbitrarily nested and looped within each other.

The applications 602 comprise high-level programs. A high-level program may include source code written in programming languages like C, C++, Java, JavaScript, Python, and/or Spatial, for example, using deep learning frameworks 614 such as PyTorch, TensorFlow, ONNX, Caffe, and/or Keras. The high-level program can implement computing structures and algorithms of machine learning models like AlexNet, VGG Net, GoogleNet, ResNet, ResNext, RCNN, YOLO, SqueezeNet, SegNet, GAN, BERT, ELMo, USE, Transformer, and/or Transformer-XL.

In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the innermost loop body, which can be exploited using loop unrolling, SIMD vectorization, and pipelining.

Regarding loops in the high-level programs of the applications 602, loops directly nested in a loop body are termed the child loops of the outer parent loop. A loop is called an innermost loop if it does not have any children, i.e., there are no nested loops within its body. A loop is an outermost loop if it does not have a parent, i.e., it is not nested within another loop's body. An imperfectly nested loop has a body with a mix of non-looping statements (e.g., primitive arithmetic, logical, and relational operations) and one or more child loops. Parallelism in the imperfectly nested loops can be exploited at any or all loop levels, and in the operations that comprise loop bodies. Parallelism can occur in multiple forms such as fine-grained and coarse-grained pipeline parallelism, data parallelism, and task parallelism.

Software development kit (SDK) 642 generates computation graphs (e.g., data flow graphs, control graphs) 636 of the high-level programs of the applications 602. The SDK 642 transforms the input behavioral description of the high-level programs into an intermediate representation such as the computation graphs 636. This may include code optimization steps like false data dependency elimination, dead-code elimination, and constant folding. The computation graphs 636 encode the data and control dependencies of the high-level programs.

The computation graphs 636 comprise nodes and edges. The nodes can represent compute operations and memory allocations. The edges can represent data flow and flow control. In some implementations, each loop in the high-level programs can be represented as a "controller" in the computation graphs 636. The computation graphs 636 support branches, loops, function calls, and other variations of control dependencies. In some implementations, after the computation graphs 636 are generated, additional analyses or optimizations focused on loop transformations can be performed, such as loop unrolling, loop pipelining, loop fission/fusion, and loop tiling.

The SDK 642 also supports programming the reconfigurable data flow resources in the pool of reconfigurable data flow resources 678 at multiple levels, for example, from the high-level deep learning frameworks 614 to C++ and assembly language. In some implementations, the SDK 642 allows programmers to develop code that runs directly on the reconfigurable data flow resources. In other implementations, the SDK 642 provides libraries that contain predefined functions like linear algebra operations, element-wise tensor operations, non-linearities, and reductions that are used for creating, executing, and profiling the computation graphs 636 on the reconfigurable data flow resources. The SDK 642 communicates with the deep learning frameworks 614 via Application Programming Interfaces (APIs) 624.

A compiler 648 transforms the computation graphs 636 into a hardware-specific configuration, which is specified in an execution file 656 generated by the compiler 648. In one implementation, the compiler 648 partitions the computation graphs 636 into memory allocations and execution fragments, and these partitions are specified in the execution file 656. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as intended by the program. Different ones of the execution fragments can contain different amounts of computation. Execution fragments can represent parallel patterns or portions of parallel patterns and are executable asynchronously.

In some implementations, the partitioning of the computation graphs 636 into the execution fragments includes treating calculations within at least one innermost loop of a nested loop of the computation graphs 636 as a separate execution fragment. In other implementations, the partitioning of the computation graphs 636 into the execution fragments includes treating calculations of an outer loop around the innermost loop of the computation graphs 636 as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data used to implement the computation graphs 636, and these memory allocations are specified in the execution file 656. Memory allocations define the type and the number of hardware resources (functional units, storage, or connectivity components). Main memory (e.g., DRAM) is off-chip memory for which the memory allocations can be made. Scratchpad memory (e.g., SRAM) is on-chip memory for which the memory allocations can be made. Other memory types for which the memory allocations can be made for various access patterns and layouts include read-only lookup-tables (LUTs), fixed size queues (e.g., FIFOs), and register files.

The compiler 648 binds memory allocations to virtual memory units and binds execution fragments to virtual compute units, and these bindings are specified in the execution file 656. In some implementations, the compiler 648 partitions execution fragments into memory fragments and compute fragments, and these partitions are specified in the execution file 656.

The compiler 648 assigns the memory fragments to the virtual memory units and assigns the compute fragments to the virtual compute units, and these assignments are specified in the execution file 656. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler 648 allocates the virtual memory units to physical memory units of a reconfigurable processor (e.g., pattern memory units (PMUs) of the reconfigurable processor) and allocates the virtual compute units to physical compute units of the reconfigurable processor (e.g., pattern compute units (PCUs) of the reconfigurable processor), and these allocations are specified in the execution file 656. The compiler 648 places the physical memory units and the physical compute units onto positions in the arrays of physical configurable units of the pool of reconfigurable data flow resources and routes data and control networks between the placed positions, and these placements and routes are specified in the execution file 656.

The compiler 648 may translate the applications 602 developed with commonly used open-source packages such as Keras and/or PyTorch into reconfigurable processor specifications. The compiler 648 generates the configuration files with configuration data for the placed positions and the routed data and control networks. In one implementation, this includes assigning coordinates and communication resources of the physical memory and compute units by placing and routing units onto the arrays of the physical configurable units while maximizing bandwidth and minimizing latency.

A runtime processor 666 receives the execution file 656 from the SDK 642 and uses the execution file 656 for resource allocation, memory mapping, and execution of the configuration files for the applications 602 on the pool of reconfigurable data flow resources 678. The runtime processor 666 may communicate with the SDK 642 over APIs 654 (e.g., Python APIs). If desired, the runtime processor 666 can directly communicate with the deep learning frameworks 614 over APIs 652 (e.g., C/C++ APIs).

Furthermore, the runtime processor 666 is operatively coupled to the pool of reconfigurable data flow resources 678 (e.g., via interface 672). If desired, interface 672 may be a PCIe interface or any other interface that enables the runtime processor 666 to exchange data with the pool of reconfigurable data flow resources 678.

The runtime processor 666 parses the execution file 656, which includes a plurality of configuration files. Configuration files in the plurality of configurations files include configurations of the virtual data flow resources that are used to execute the user applications 602. The runtime processor 666 allocates a subset of the arrays of physical configurable units in the pool of reconfigurable data flow resources 678 to the virtual data flow resources.

The runtime processor 666 then loads the configuration files for the applications 602 to the subset of the arrays of physical configurable units. In the scenario in which the execution file 656 includes two user applications 602 (e.g., a first and a second user application), the runtime processor 666 is configured to load a first configuration file for executing the first user application to a first subset of the arrays of physical configurable units in the pool of reconfigurable data flow resources 678, and to load a second configuration file for executing the second user application to a second subset of the arrays of physical configurable units in the pool of reconfigurable data flow resources 678. The runtime processor 666 may assign a first subset of the memory units to the first user application and a second subset of the memory units to the second user application. In some implementations, the memory units and the arrays of physical configurable units of the one or more reconfigurable processors in the pool of reconfigurable data flow resources 678 are aggregated as a uniform pool of resources that are assigned to the execution of the first and second user applications 602.

The runtime processor 666 then starts execution of the user applications 602 on the subsets of the arrays of physical configurable units. In the scenario in which the execution file 656 includes the first and second user application, the runtime processor 666 is configured to start execution of the first and second user applications 602 on the first and second subsets of the arrays of physical configurable units. In this scenario, the runtime processor 666 is further configured to prevent the first user application 602 from accessing the second subset of the memory units and the second subset of the arrays of physical configurable units, and to prevent the second user application 602 from accessing the first subset of the memory units and the first subset of the arrays of physical configurable units.

An application for the purposes of this description includes the configuration files for reconfigurable data flow resources in the pool of reconfigurable data flow resources 678 compiled to execute a mission function procedure or set of procedures using the reconfigurable data flow resources, such as inferencing or learning in an artificial intelligence or machine learning system. A virtual machine for the purposes of this description comprises a set of reconfigurable data flow resources (including arrays of physical configurable units in one or more reconfigurable processor and bus and memory units) configured to support execution of an application in arrays of physical configurable units and associated bus and memory units in a manner that appears to the application as if there were a physical constraint on the resources available, such as would be experienced in a physical machine. The virtual machine can be established as a part of the application of the mission function that uses the virtual machine, or it can be established using a separate configuration mechanism. In implementations described herein, virtual machines are implemented using resources of the pool of reconfigurable data flow resources 678 that are also used in the application, and so the configuration files for the application include the configuration data for its corresponding virtual machine, and links the application to a particular set of physical configurable units in the arrays of physical configurable units and associated bus and memory units.

The runtime processor 666 implements a first application in virtual machine VM1 that is allocated a particular set of reconfigurable data flow resources and implements a second application in virtual machine VM2 that is allocated another set of reconfigurable data flow resources. Virtual machine VM1 includes a particular set of physical configurable units, which can include some or all physical configurable units of a single reconfigurable processor or of multiple reconfigurable processors, along with associated bus and memory units (e.g., PCIe channels, DMA channels, DDR channels, DRAM memory). Virtual machine VM2 includes another set of physical configurable units, which can include some or all physical configurable units of a single reconfigurable processor or of multiple reconfigurable processors, along with associated bus and memory units (e.g., PCIe channels, DMA channels, DDR channels, DRAM memory).

The runtime processor 666 respects the topology information (e.g., topology information 704 of FIG. 7) in the execution file 656 when allocating physical configurable units to the virtual data flow resources requested in the execution file 656. For example, consider the scenario in which the reconfigurable processor has a non-uniform communication bandwidth in East/West directions versus North/South directions. In this scenario, a virtual tile geometry that requires, for example, two tiles arranged horizontally, may suffer in performance if mapped to a physical tile geometry in which two tiles are arranged vertically. In some implementations, the topology information may specify rectilinear tile geometries.

As discussed above, the configurations of virtual data flow resources in the execution file 656 specify virtual memory segments for the reconfigurable data flow resources in the pool of reconfigurable data flow resources 678, including virtual address spaces of the virtual memory segments and sizes of the virtual address spaces. The runtime processor 666 maps the virtual address spaces of the virtual memory segments to physical address spaces of physical memory segments in the memory. The memory can be host memory, or device memory (e.g., off-chip DRAM).

The runtime processor 666 configures control and status registers of the reconfigurable data flow resources in the pool of reconfigurable data flow resources 678 with configuration data identifying the mapping between the virtual address spaces and the physical address spaces for the configuration files to access the physical memory segments during execution of the applications 602. Accordingly, a first set of the physical memory segments mapped to a first set of the reconfigurable data flow resources in the pool of reconfigurable data flow resources 678 allocated to a first application are different from a second set of the physical memory segments mapped to a second set of the reconfigurable data flow resources in the pool of reconfigurable data flow resources 678 allocated to a second application. Furthermore, access of the first set of the reconfigurable data flow resources is confined to the first set of the physical memory segments, and access of the second set of the reconfigurable data flow resources is confined to the second set of the physical memory segments.

Figure 7:
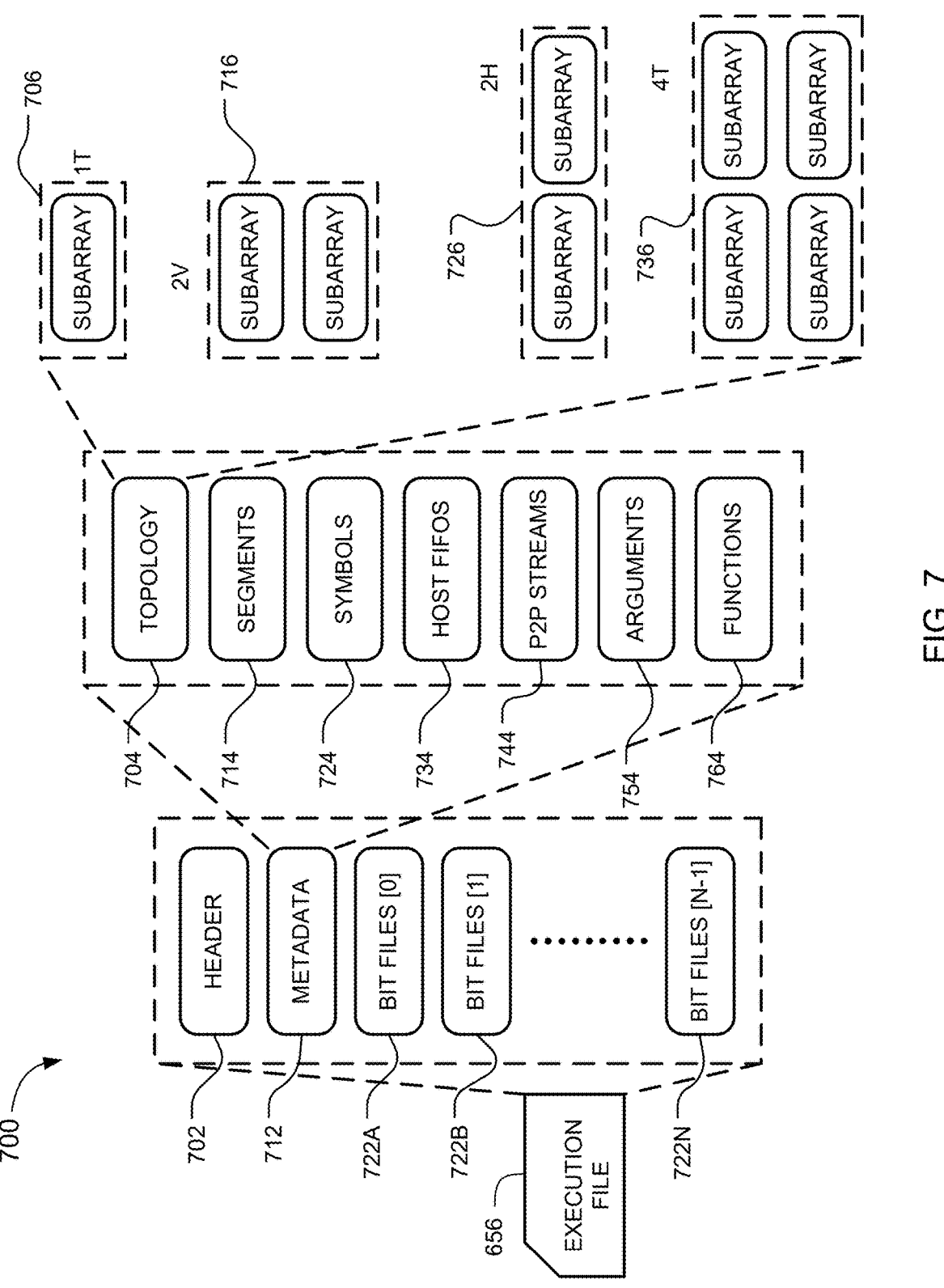
FIG. 7 is a diagram of an illustrative implementation of an execution file used by the technology disclosed to execute the applications on arrays of physical configurable units in the pool of reconfigurable data flow resources.

Turning to FIG. 7, the illustrative execution file 700 includes configuration files (e.g., configuration files 722a, 722b, . . . 722n). The configuration files are sometimes also referred to as bit files 722a, 722b, . . . 722n that implement the computation graphs 636 of the user applications 602 using the arrays of physical configurable units and the bus and memory units in the pool of reconfigurable data flow resources 678 of FIG. 6.

A program executable contains a bit-stream representing the initial configuration, or starting state, of each of the physical configurable units that execute the program. This bit-stream is referred to as a bit file, or hereinafter as a configuration file. The execution file 656 includes header 702 that indicates destinations on the reconfigurable processors for configuration data in the configuration files. In some implementations, a plurality of configuration files is generated for a single application.

The execution file 656 includes metadata 712 that accompanies the configuration files and specifies configurations of virtual data flow resources used to execute the applications 602. In one example, the execution file 656 can specify that a particular application uses an entire reconfigurable processor for execution, and as a result the metadata 712 identifies virtual data flow resources equaling at least the entire reconfigurable processor for loading and executing the configuration files for the particular application. In another example, the execution file 656 can specify that a particular application uses one or more portions of a reconfigurable processor for execution, and as a result the metadata 712 identifies virtual data flow resources equaling at least the one or more portions of the reconfigurable processor for loading and executing the configuration files for the particular application.

In yet another example, the execution file 656 can specify that a particular application uses an entire node for execution, and as a result the metadata 712 identifies virtual data flow resources equaling at least the entire node for loading and executing the configuration files for the particular application. In yet another example, the execution file 656 can specify that a particular application uses two or more nodes for execution, and as a result the metadata 712 identifies virtual data flow resources equaling at least the two or more nodes for loading and executing the configuration files for the particular application.

One skilled in the art would appreciate that the execution file 656 can similarly specify reconfigurable processors or portions thereof spanning across racks, pods, superpods, and zones in a data center, and as a result the metadata 712 identifies virtual data flow resources spanning across the racks, pods, superpods, and zones in the data center for loading and executing the configuration files for the particular application.

As part of the metadata 712, the execution file 656 includes topology information 704 that specifies orientation or shapes of portions of a reconfigurable processor for loading and executing the configuration files for a particular application.

In one implementation, a reconfigurable processor comprises a plurality of tiles of configurable units. Illustratively, a reconfigurable processor may include two tiles (e.g., the CGR architecture 300 of FIG. 3), each including a CGR array. If desired, a reconfigurable processor may include more than two tiles. For example, a reconfigurable processor may include four, eight, or sixteen tiles, or any other number of tiles that is not a power of two. The topology information 704 specifies an orientation of tiles in the plurality of tiles used to load and execute the configuration files for a particular application.

For example, when the particular application is allocated two tiles of the reconfigurable processor, the topology information 704 specifies whether the two tiles are arranged in a vertical orientation (2V) 716 or a horizontal orientation (2H) 726. The topology information 704 can also allocate a single tile (1T) 706 of the reconfigurable processor to the particular application. The topology information 704 can also allocate four tiles (4T) 736 of the reconfigurable processor to the particular application. In other implementations, other geometries may be specified, such as a group of three tiles.

The execution file 656 also specifies virtual flow resources like PCIe channels, DMA channels, and DDR channels used to load and execute the configuration files for a particular application. The execution file 656 also specifies virtual flow resources like main memory (e.g., off-chip/external DRAM), local secondary storage (e.g., local disks (e.g., HDD, SSD)), remote secondary storage (e.g., distributed file systems, web servers), latches, registers, and caches (e.g., SRAM) used to load and execute the configuration files for a particular application.

The execution file 656 also specifies virtual memory segments 714 for the requested virtual flow resources, including virtual address spaces of the virtual memory segments and sizes of the virtual address spaces. The execution file 656 also specifies symbols 724 (e.g., tensors, streams) used to load and execute the configuration files for a particular application. The execution file 656 also specifies HOST FIFOs 734 accessed by the configuration files for a particular application during execution. The execution file 656 also specifies peer-to-peer (P2P) streams 744 (e.g., data flow exchanges and control token exchanges between sources and sinks) exchanged between configurable units on which the configuration files for a particular application are loaded and executed. The execution file 656 also specifies arguments 754 that modify execution logic of a particular application by supplying additional parameters or new parameter values to the configuration files for the particular application. The execution file 656 also specifies functions 764 (e.g., data access functions like transpose, alignment, padding) to be performed by the configurable units on which the configuration files for a particular application are loaded and executed.

Figure 8:
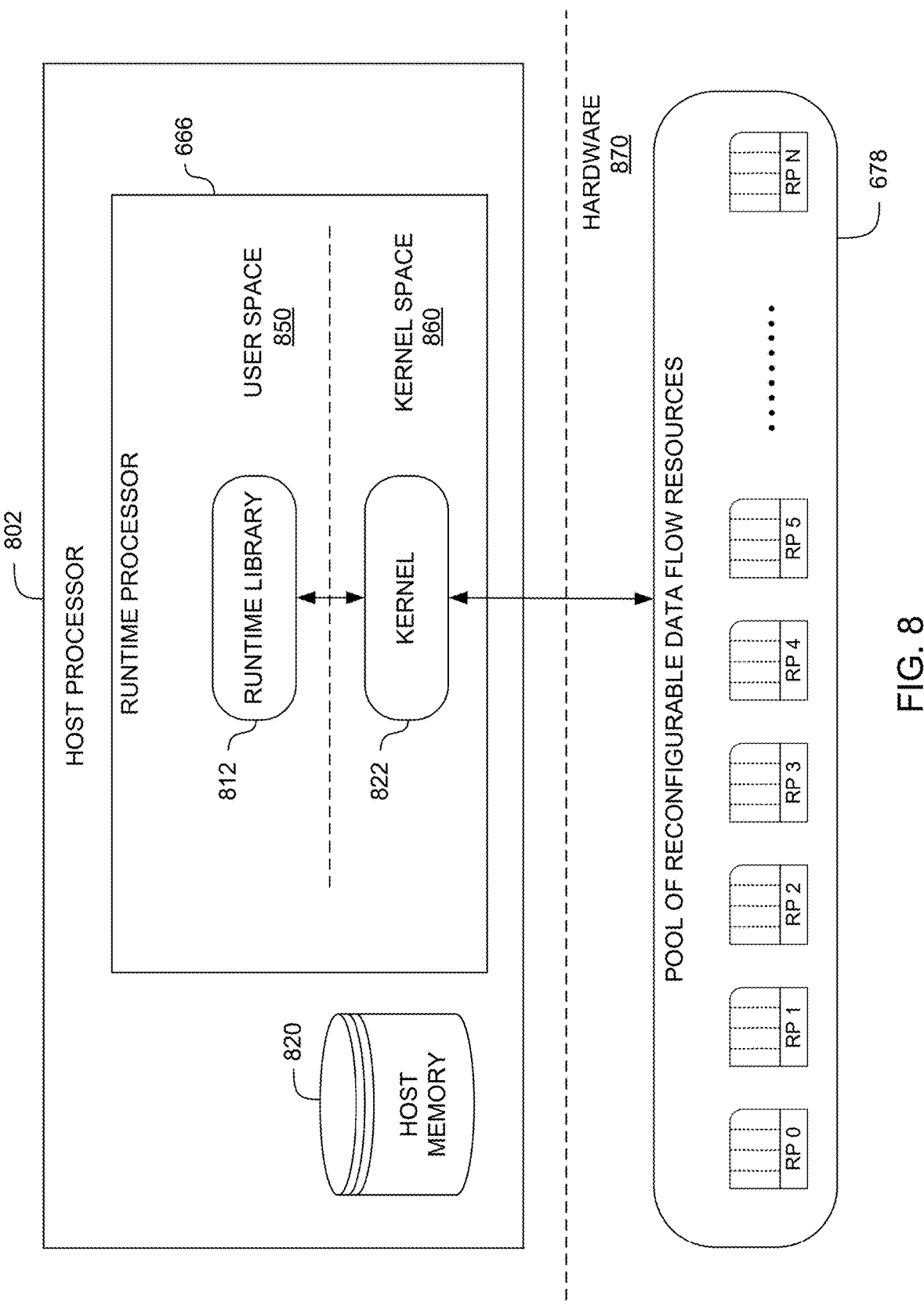
FIG. 8 is a diagram of an illustrative host processor that includes a runtime processor that is operatively coupled to the pool of reconfigurable data flow resources.

As illustratively shown in FIG. 8, the runtime processor 666 may run in a host processor 802, which is operatively coupled to the pool of reconfigurable data flow resources 678 (e.g., via a PCIe interface). The host processor 802 runs the software components for user request, compute resource, and communication management. In one implementation, the host processor 802 uses a PCIe interface that manages reconfiguration of the memory units, the busses, and the arrays of physical configurable units in the pool of reconfigurable data flow resources 678 and movement of data into and out of the pool of reconfigurable data flow resources. A built-in arbiter guarantees fair communication bandwidth to every reconfigurable processor when multiple reconfigurable processors are communicating with the runtime processor 666.

The runtime processor 666 includes a runtime library 812 that runs in a user space 850 of the host processor 802. The runtime processor 666 includes a kernel module 822 that runs in a kernel space 860 of the host processor 802. The host processor 802 has host memory 820. In implementations disclosed herein, the runtime processor 666, based on virtual data flow resources requested in an execution file (e.g., execution file 656 of FIG. 6) for configuration files of a particular application (e.g., one of applications 602 of FIG. 6), allocates segments of the host memory 820 to a virtual machine that implements the particular application. In one implementation, the runtime processor 666 runs on top of Linux.

The runtime processor 666 partitions the physical hardware resources in the hardware space 870, i.e. the components in the pool of reconfigurable data flow resources, into multiple virtual resources, and provides uniform and coherent access to these virtual resources as being physical in a balanced and unified view. It also manages all interactions among the applications and their respective resources by handling the traffic of application requests for reconfigurable resources, memory, and I/O channels.

Figure 9:
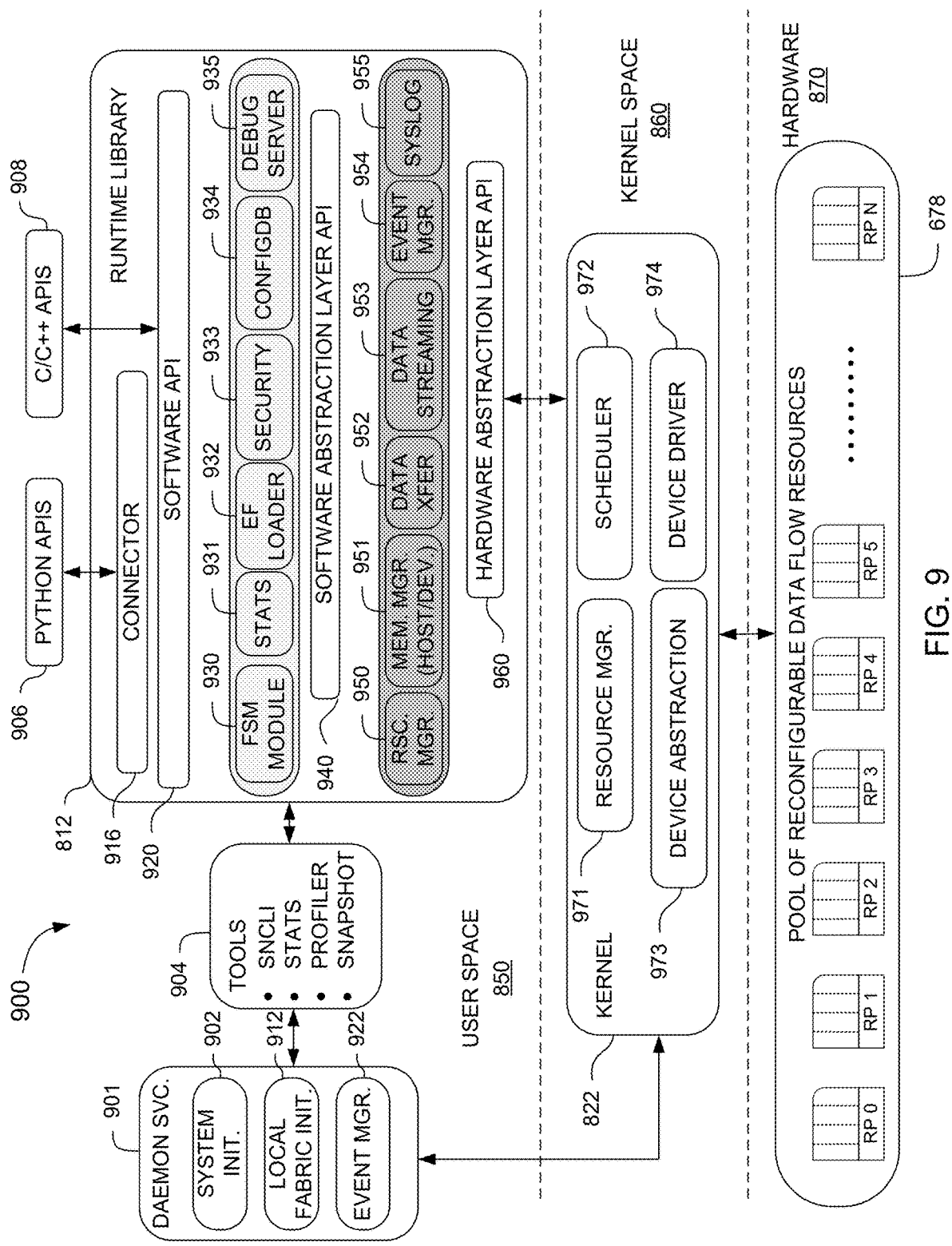
FIG. 9 is a diagram of an illustrative implementation of a software stack implemented by a runtime processor, which enables runtime virtualization of reconfigurable data flow resources in the pool of reconfigurable data flow resources.

FIG. 9 illustrates one implementation of a software stack 900 implemented by the runtime processor 666 of FIG. 8, which enables runtime virtualization of reconfigurable data flow resources in the pool of reconfigurable data flow resources 678 according to the technology disclosed. The software stack 900 includes a daemon module 901, tools 904, and the runtime library 812, which operate in the user space 850. The software stack 900 also includes the kernel module 822, which operates in the kernel space 860.

The runtime processor partitions the physical hardware resources in hardware space 870, i.e. the memory units, busses, and the arrays of physical configurable units in the pool of reconfigurable data flow resources, into multiple virtual resources, and provides uniform and coherent access to these virtual resources as being physical in a balanced and unified view. The runtime processor also manages all interactions among the user applications (e.g., user applications 602 of FIG. 6) and their respective resources by handling the traffic of application requests for memory units, busses, and arrays of physical configurable units.

The daemon module 901 runs as a system service and may include a system initializer 902, a local fabric initializer 912, and an event manager 922. If desired, the daemon module 901 may include a fault management module. Illustratively, the fault management module may be built in conjunction with the event manager 922. The system initializer 902 initializes the physical hardware resources in the pool of reconfigurable data flow resources 678. The local fabric initializer 912 initializes bus and memory units, including device DDR and local PCIe fabric. The event manager 922 manages hardware faults and enables debugging of the hardware resources in the pool of reconfigurable data flow resources 678. The tools 904 may include a command line interface (CLI), a statistics provider, a profiler and snapshot for debugging, profile system, and graph applications.

The runtime library 812 includes a connector 916, a software API 920, a software abstraction layer API 940, and a hardware abstraction layer API 960. The connector 916, the software API 920, the software abstraction layer API 940, and the hardware abstraction layer API 960 are a collection of multilingual programming API suites (e.g., Python/C/C++) that the user applications (e.g., machine learning applications) can use to interact with the reconfigurable processors and their associated memory subsystems. The user applications access the software stack 900 via the APIs like Python APIs 906 and/or C/C++ APIs 908.

The runtime library 812 may also include a finite state machine (FSM) module 930, a statistics calculator 931, an execution file loader 932, a security module 933, a configuration database 934, and a debug server 935. The FSM module 930 defines a list of states representing the basic operations that can be grouped together to form an operation flow for a user application. The statistics calculator 931 provides interfaces to read performance counters from the reconfigurable processors in the pool of reconfigurable data flow resources 678. The execution file loader 932 loads and parses the execution file (e.g., execution file 656 of FIG. 6 or FIG. 7) and creates data structures of resources for running a user application (e.g., number of tiles/reconfigurable processors, memory segments, busses, arguments, host FIFOs, etc.). The security module 933 maintains isolation between user applications and prevents users/applications from accessing resources not allocated to them. The configuration database 934 includes configuration data for configuring the reconfigurable data flow resources in the pool of reconfigurable data flow resources 678 for executing the user applications. The debug server 935 processes the CLI commands.

The runtime library 812 may also include a resource manager 950, a memory manager 951, a data transfer module 952, a data streaming module 953, a fault manager 954, which is sometimes also referred to as a fault management module 954, and a system log 955. If desired, at least some portions of the fault management module 954 may be part of the daemon module 901. For example, these portions of the fault management module 954 may be built in conjunction with the event manager 922 of the daemon module 901. The resource manager 950 generates requests for the kernel module 822 to manage resources in the pool of reconfigurable data flow resources 678. The memory manager 951 manages the host memory and the device memory (e.g., on-chip and off-chip memory of the reconfigurable processors) and provides efficient allocation/free functions for the user applications and binary data (e.g., bit files, data, arguments, segments, symbols, etc.) in the execution file. The data transfer module 952 handles data transfer requests between the host processor and the reconfigurable processors. The data transfer module 952 provides APIs to transfer bit files, arguments, tensors, etc. from the host memory to the reconfigurable processor memory and from the reconfigurable processor memory to the host memory. The transfer is done through hardware supported methods like DMA, memory-mapped files, and/or Remote Direct Memory Access (RDMA). The data streaming module 953 provides GET/SET interfaces to stream data in and out of the reconfigurable processors using host FIFOs. The fault management module 954 identifies the source of hardware interrupts and delivers interrupt events to the daemon module 901 and/or the user applications. The system log 955 logs messages from the daemon module 901 and the applications 602.

The kernel module 822 may include a resource manager 971, a scheduler 972, a device abstraction module 973, and a device driver 974. The resource manager 971 manages the host memory and the device memory (e.g., on-chip and off-chip memory of the reconfigurable processors) and provides efficient allocation/free functions for the user applications and binary data (e.g., bit files, data, arguments, segments, symbols, etc.) in the execution file. The scheduler 972 manages queuing and mapping of the configuration files for the user applications depending on the availability of the hardware resources. The device driver 974 creates device units, interfaces with the reconfigurable processors (e.g., by managing low level PCIe input/output operations and DMA buffers), and processes hardware interrupts.

The device abstraction module 973 scans all the reconfigurable processors in the pool of reconfigurable data flow resources 678 and presents them as a single virtual reconfigurable processor device to the user space 850. As an example, all reconfigurable processors in the pool of reconfigurable data flow resources 678 may be presented to the user space as device/dev/rdu.

Thus, the runtime processor is connected to the pool of reconfigurable data flow resources 678 and configured to provide unified access to the plurality of reconfigurable processors via a file system. The runtime processor abstracts out multiple reconfigurable processors, including their hardware resources (e.g., arrays and subarrays of physical configurable units, busses, and memory units), into a single virtual reconfigurable processor device for the user applications running in the user space 850.

The kernel module 822 dynamically discovers reconfigurable processors in the pool of reconfigurable data flow resources 678 during module initialization and presents them as a single virtual device (e.g., /dev/rdu) to the user applications running in the user space 850. As a result, each reconfigurable processor acts as a core and each array of configurable units acts as a hardware thread, which can be dynamically allocated to a process by the resource manager 971 of the kernel module 822.

Furthermore, specific device resources in the pool of reconfigurable data flow resources 678 are initially carved out by the resource manager 971 and/or the device driver 974 for each graph process in the user space 850 based on the configuration file. In some implementations, PCIe configuration and status (CSR) register spaces in the pool of reconfigurable data flow resources 678 are directly mapped to the processes that a graph runs in the user space 850 (which are sometimes also referred to as "user space graph processes") so that the running process may omit sending a request to the device driver 974 in the kernel space 860 for any hardware programming. This saves the latency of a system call, or having to ask the device driver 974 for reading from or writing to the memory units and/or the arrays of physical configurable units in the pool of reconfigurable data flow resources 678 and wait until the memory units and/or the arrays of physical configurable units have completed the read or write operation.

Mapping the PCIe configuration and status register (CSR) spaces directly to the user space graph processes works perfectly well within a well-trusted environment. However, in a less-secure environment, such as cloud computing, it would be desirable to better isolate each user space graph process, because a user space graph process must not be able to interfere with any other user space graph process that shares a set of reconfigurable processors in the pool of reconfigurable data flow resources 678. Such improved isolation between user space graph processes may also provide for improved resource utilization as it enables dynamic resource sharing. For example, execution resources that are assigned statically to a graph can be allocated on demand when the graph is ready to execute.

Illustratively, a runtime processor (e.g., runtime processor 666 of FIG. 8) includes a user space 850 and a kernel space 860, and the kernel space 860 may be exclusively authorized to execute predetermined privileged operations on the pool of reconfigurable data flow resources 678. As an example, the pool of reconfigurable data flow resources 678 may include configuration registers for configuring the arrays of physical configurable units, and the predetermined privileged operations may include operations that access the configuration registers. As another example, in the scenario of executing a first and a second user application on the pool of reconfigurable data flow resources 678, the resource manager 971 in the kernel space 860 may be configured to track a first allocation of a first subset of memory units and of a first subset of the arrays of physical configurable units to the first user application and a second allocation of a second subset of the memory units and of a second subset of the arrays of physical configurable units to the second user application.

Illustratively, the kernel space 860 may include a privileged entity that authorizes the execution of predetermined privileged operations on the pool of reconfigurable data flow resources 678. The privileged entity may include validation logic that ensures that each user graph is isolated and cannot interfere with any other user graph that shares a set of reconfigurable processors in the pool of reconfigurable data flow resources 678. Preferably, the validation logic is not part of the user graph itself, because a user graph is not trusted to police itself.

Anytime a user graph tries to read from or write to a resource in the pool of reconfigurable data flow resources 678, or do any type of programming, or running the user graph, or transfer data between the host memory and the pool of reconfigurable data flow resources 678, that privileged entity must verify that the user graph is authorized to execute that operation, and the operation may be executed only after a successful verification.

For example, a transfer of data from a memory to the address space of a graph requires the device driver 974 and/or some other entity in the kernel space 860 to verify that this graph was given the amount of memory between a start address and an end address. If the graph tries to read from or write to an address, which is not within the graph's allocated address space, the privileged entity denies that operation and that operation fails.

In some implementations, the privileged entity may include a layer of validation logic to ensure that the graph's attempt to program certain memory locations are indeed valid. For example, the validation logic may verify whether a memory location being written to or read from is valid and is actually owned by the graph that is trying to access this memory location. Furthermore, validation may be performed prior to the programming of the user specified values into the registers of the arrays of physical configurable units.

Figure 10:
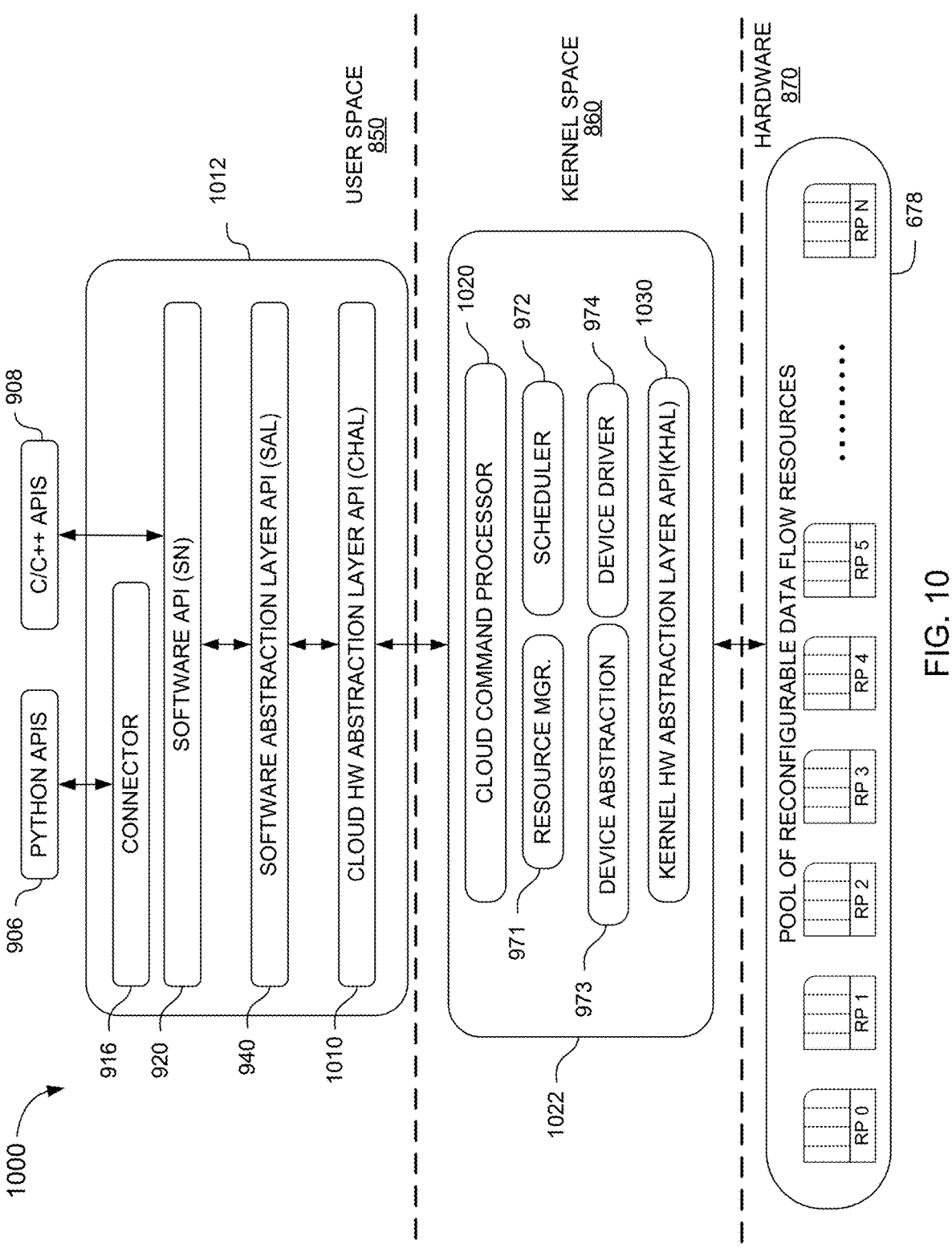
FIG. 10 is a diagram of an illustrative implementation of a software stack implemented by a runtime processor with additional levels of isolation between the software abstraction layer API in the user space of the runtime processor and the pool of reconfigurable data flow resources.

Compared to the compute environment of FIG. 9, the compute environment 1000 of FIG. 10 aims to provide an additional level of isolation between the runtime library 1012 in the user space 850 and the pool of reconfigurable data flow resources 678 in the hardware space 870. In some implementations, privileged operations such as register read/ write operations may be restricted to the kernel space 860. The indirect interaction with the hardware space 870 may be achieved through the means of a so-called Cloud Hardware Abstraction Layer (CHAL) 1010 in the runtime library 1012. For example, the user space graph (e.g., a neural network data-flow on a reconfigurable processor in the pool of reconfigurable data flow resources 678) can submit a single command or a batch of commands to read/write to/from the reconfigurable processors and await responses (synchronously or asynchronously) in the user space 850.

Illustratively, kernel module 1022 in the kernel space 860 may include a cloud command processor 1020 for interacting with the CHAL 1010 in the user space 850. If desired, the kernel module 1022 may include a kernel hardware abstraction layer (KHAL) 1030. The KHAL 1030 may implement rigid safeguards to allow the execution of multiple trusted graphs in the pool of reconfigurable data flow resources 678 and to prevent compromised or rogue graphs from impacting the programming of other graphs.

In some implementations, the resource manager 971 in the kernel module 1022 may be responsible for assigning resources from the pool of reconfigurable data flow resources 678 to a graph. If desired, the resource manager 971 may track and record which resources in the pool of reconfigurable data flow resources are owned by which graphs at any instant of time.

The resource manager 971 runs as part of the kernel module 1022 and has all the knowledge of resource assignments in the pool of reconfigurable data flow resources 678. Thus, validation logic may be implemented in the resource manager 971, if desired. In some implementations, the resource manager 971 may be part of the device driver 974, and the device driver 974 may include the validation logic.

Linux provides standard system call interfaces like read( )/write( )/ioctl( ) to switch the mode from user to graph. Thus, the validation logic may invoke an ioctl( ) system call to request any device programming during the configuration of the memory units and the arrays of physical configurable units in the pool of reconfigurable data flow resources 678, instead of authorizing that the graph directly configures the memory units and the arrays of physical configurable units in the pool of reconfigurable data flow resources 678.

System calls, which are sometimes also referred to as kernel upcalls, are processing intensive. Invoking system calls during the configuration of the memory units and the arrays of physical configurable units results in additional latency compared to device programming without invoking system calls. For example, each ioctl( ) system call may cause an additional latency of 8 to 10 microseconds. A typical graph makes many device programming requests. Hence, the time to run each graph would suffer from additional overhead, proportional to the number of device programming requests.

The additional overhead may be mitigated by a higher-level functionality in the kernel space 860 which may involve many related configuration register operations. Furthermore, sharding or duplication of symbols can be performed by invoking one single kernel call. In some scenarios, the execution of a graph may require a plurality of resources in the pool of reconfigurable data flow resource 678. In such scenarios, a single kernel call can be invoked for configuring all the resources being used in the graph, followed by checking for completion of the configuration on all resources of the plurality of resources in the pool of reconfigurable data flow resources 678.

A significant source of overhead also comes from copying the programming requests information, which is sometimes also referred to as 'payload', between the user space graph process and the kernel space. Copying the programming requests information typically involves copying the command-payload from the user space graph process memory to the kernel memory and copying the result-payload from the kernel memory to the user space graph process memory, which can be computationally expensive and adds latency due to a memory copy operation. In fact, each copy operation involves a memory read and a memory write operation by which the payload moves between the non-privileged entity (i.e., the graph in the user space 850) and the privileged one (i.e., the kernel module 1022 in the kernel space 860). Avoiding the copy operation may be achieved by establishing shared memory areas through which commands and results are passed between the kernel module 1022 in the kernel space 860 and the user space graph processes in the user space 850.

Figure 11:
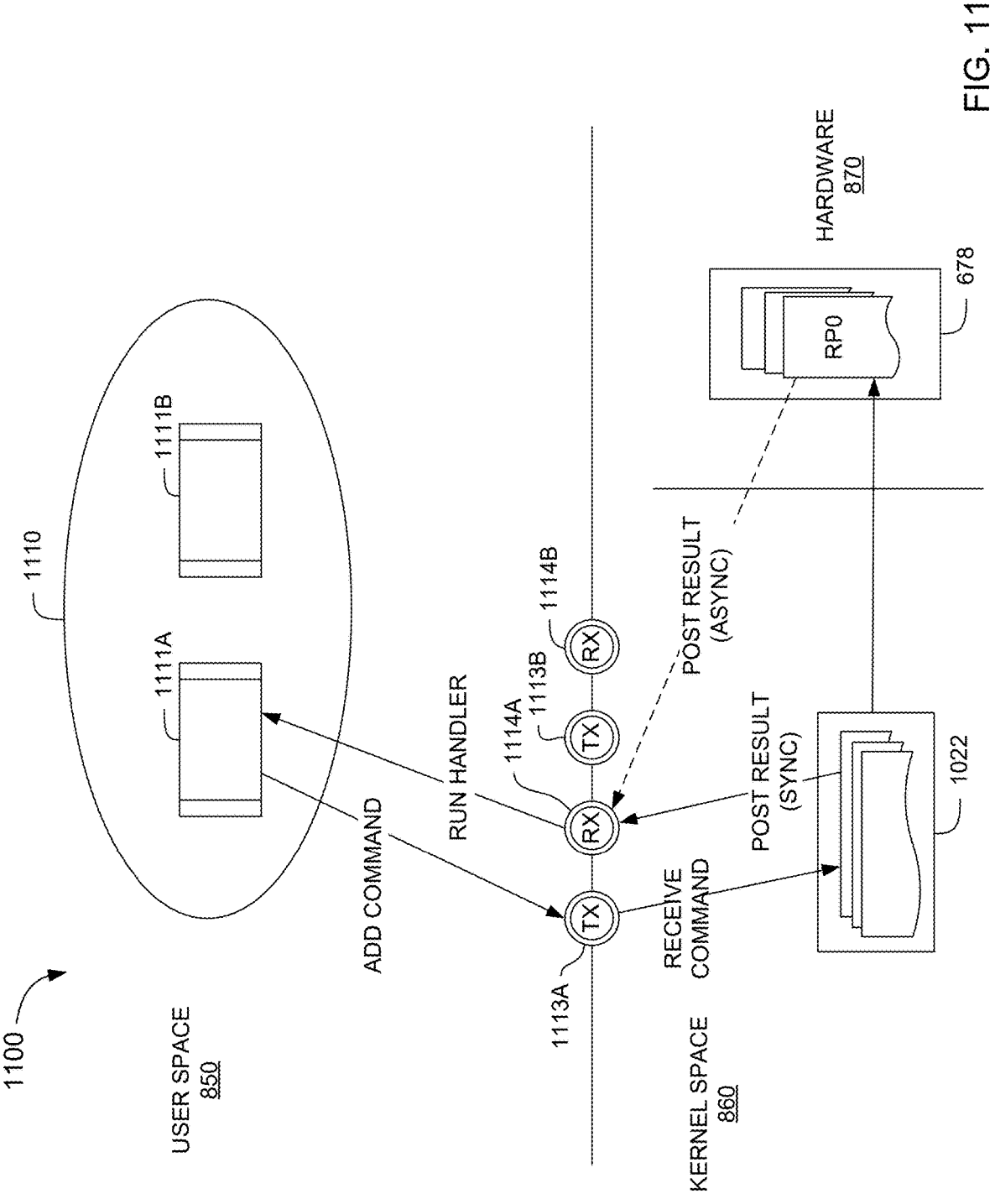
FIG. 11 is a diagram of an illustrative compute environment with a runtime processor that has shared memory areas between the user space and the kernel space through which commands and results can be passed between the kernel module and user space graph processes.

FIG. 11 is a diagram of an illustrative compute environment 1100 with a runtime processor that has shared memory areas between the user space 850 and the kernel space 860 through which commands and results can be passed between the kernel module 1022 and user space graph processes.

In some implementations, a communication module 1110 that is sometimes also referred to as 'channel manager' in the runtime processor may be used for the communication between the user space 850 and the kernel space 860. In some implementations, the channel manager 1110 may be located in the user space 850. In other implementations, the channel manager may be located in the kernel space 860 (e.g., in the device driver).

The channel manager 1110 may provide a graph a distinct pair of request and result queues and some associated set of operations to submit requests and receive results. For example, the channel manager 1110 may provide a handler function, post commands, poll channels for results, etc.

If desired, the channel manager may create one or more secure channels for each functional block—e.g., DMA, Graph-ctrl, FIFO, ATR, Host-Tables etc. However, one channel may be created for more than one functional block, or a single channel may be created for all functional blocks.

Each command/result queue pair may be encapsulated in an entity that is sometimes referred to as 'secure channel'

1111A, 1111B. Each secure channel 1111A, 1111B may be associated with a transmitter channel 1113A, 1113B having a buffer (e.g., a ring buffer, a FIFO, a LIFO, etc.) and a receiver channel 1114A, 1114B having another buffer (e.g., a ring buffer, a FIFO, a LIFO, etc.). The user space 850 may be configured to transmit commands for the kernel space 860 through the transmitter channel 1113A, 1113B. The kernel space 860 may be configured to transmit results to the user space 850 through the receiver channel 1114A, 1114B.

In some implementations, the channel manager 1110 may process a batch of requests at once for each system call. If desired, a batch of requests may be used for graph control requests where various requests to control the execution of a graph (e.g., program-load, argument-load, segment-load and program-exec) are done repeatedly or for a continuous sequence of tensor transfer operations where the kernel module 1022 can process the requests when they arrive, without having to invoke a separate system call for each request.

Illustratively, at least one transmitter channel 1113A, 1113B and/or at least one receiver channel 1114A, 1114B may include a shared memory area. If desired, a user space graph process may queue up device requests using the shared memory area, and the kernel module 1022 may process the device requests without making a separate context switch for each device request. Processing the device requests using shared memory is typically a few microseconds faster compared to invoking the same device requests using a system call. Thereby, some degree of asynchrony may be achieved which enables the user space graph process to pipeline other operations while the kernel module 1022 is executing the device programming on its behalf.

Figure 12:
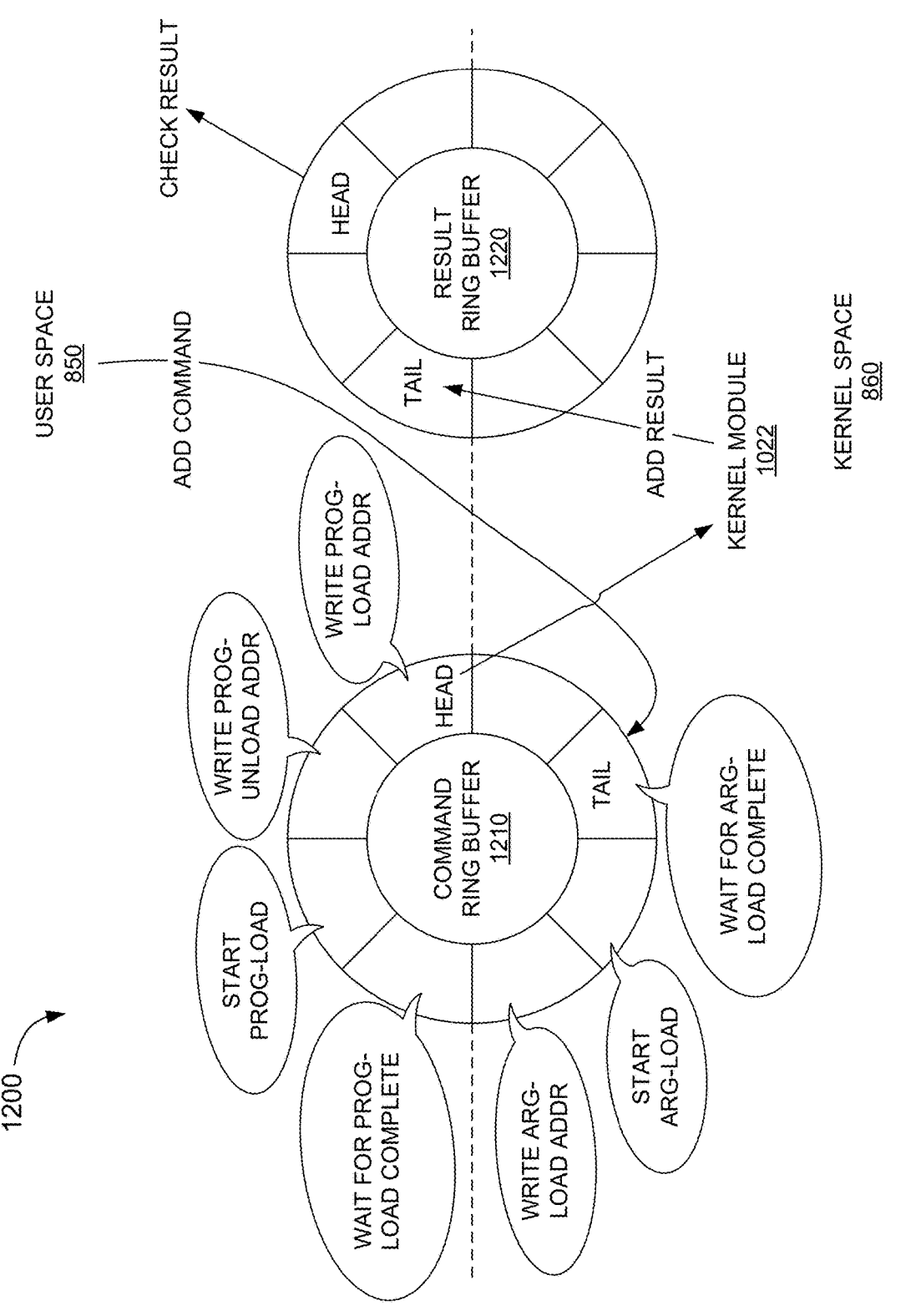
FIG. 12 is a diagram of an illustrative runtime processor with a command ring buffer for passing commands from the user space to the kernel space and a result ring buffer for passing results from the kernel space to the user space.

FIG. 12 is a diagram of an illustrative runtime processor 1200 with a command ring buffer 1210 for passing commands from the user space 850 to the kernel space 860 and a result ring buffer 1220 for passing results from the kernel space 860 to the user space 850. For example, the transmit channel 1113A of FIG. 11 may include command ring buffer 1210, and the receiver channel 1114A of FIG. 11 may include result ring buffer 1220, if desired.

In some implementations, arrays of physical configurable units (e.g., the arrays of physical configurable units in the pool of reconfigurable data flow resources 678 of FIG. 6) may be configured to implement the first and second ring buffers. If desired, the arrays of physical configurable units may be configured to retrieve the commands from the first ring buffer and to submit results from processing the commands to the second ring buffer.

Illustratively, the pool of reconfigurable data flow resources (e.g., pool of reconfigurable data flow resources 678 of FIG. 6) may include a network interface card. The network interface card may couple at least two of the arrays of physical configurable units arranged in at least two different reconfigurable processors (e.g., reconfigurable processor RP1 and reconfigurable processor RP2 of FIG. 6). If desired, the network interface card may be configured to implement the first and second ring buffers.

In some implementations, the channel manager (e.g., channel manager 1110 of FIG. 11) may be configured to find a next free slot in the command ring buffer 1210 for submitting a new command for the kernel space 860 and notify the kernel space 860 (e.g., the kernel module 1022 in the kernel space 860) that the new command has been added to the command ring buffer 1210.

Illustratively, command ring buffer 1210 and result ring buffer 1220 may have a head and a tail pointer. The user space graph processes may submit commands to the ring buffer segment to which the tail pointer of the command ring buffer 1210 points and retrieve results at the ring buffer segment to which the head pointer of the result ring buffer 1220 points, whereas the kernel module 1022 may retrieve commands from the ring buffer segment to which the head pointer of the command ring buffer 1210 points and submit results to the ring buffer segment to which the tail pointer of the result ring buffer 1220 points.

In some implementations, the channel manager may increment the tail pointer of the command ring buffer 1210 when the user space graph processes have submitted a new command to the command ring buffer 1210. Thus, the channel manager may increment the tail pointer of the command ring buffer 1210 to notify the kernel space 860 that a new command has been added to the command ring buffer 1210. If desired, the channel manager may increment the head pointer of the command ring buffer 1210 whenever the kernel module 1022 has retrieved a command from the command ring buffer 1210. Thus, the kernel module 1022 may stop retrieving commands from the command ring buffer 1210 after the kernel module 1022 has retrieved the command from the command ring buffer segment to which both, the head pointer and the tail pointer of the command ring buffer 1210 point. In other words, the kernel module 1022 stops retrieving commands from the command ring buffer 1210 after the head pointer has caught up with the tail pointer. Thus, the kernel module 1022 retrieves the commands from the command ring buffer 1210 in the order in which the user space graph processes have submitted the commands to the command ring buffer 1210.

Similarly, the channel manager may increment the tail pointer of the result ring buffer 1220 when the kernel module 1022 has submitted a new result to the result ring buffer 1220. Thus, the channel manager may increment the tail pointer of the result ring buffer 1220 to notify the user space graph processes that a new result has been added to the result ring buffer 1220. If desired, the channel manager may increment the head pointer of the result ring buffer 1220 whenever the user space graph processes have retrieved a result from the result ring buffer 1220. Thus, the user space graph process may stop retrieving results from the result ring buffer 1220 after the user space graph process has retrieved the result from the result ring buffer segment to which both, the head pointer and the tail pointer of the result ring buffer 1220 point. In other words, the user space graph processes stop retrieving results from the result ring buffer 1220 after the head pointer has caught up with the tail pointer. Thus, the user space graph processes retrieve the results from the result ring buffer 1220 in the order in which the kernel module 1022 has submitted the results to the result ring buffer 1220.

As an example, the user space graph processes may submit the commands "write program load address", "write program unload address", "start program load", "wait for program load to complete", "write argument load address", "start argument load", and "wait for argument load complete" in this order to the command ring buffer 1210. The kernel module 1022 in the kernel space 860 is configured to retrieve these commands from the command ring buffer 1210 in this same order.

Consider the scenario in which hardware components can be exercised in parallel. As an example, the compute environment may provide DMA channels that couple the memory units and/or the arrays of physical configurable units in the pool of reconfigurable data flow resources with the host memory for transferring data between the host memory and the memory units and/or the arrays of physical configurable units in parallel. As another example, the compute environment may provide a large number of hardware buffers (e.g., FIFOs) for moving data between the host-memory and the memory units and/or the arrays of physical configurable units simultaneously. In such a scenario, each hardware resource (DMA channel or FIFO) may be mapped to a distinct secure channel, and all of these distinct secure channels are exposed to the user space graph processes. This way, the user space graph processes may be able to schedule many DMA or FIFO operations in parallel. The kernel module will be executing all these operations simultaneously using many CPU cores/threads.

The user space graph processes may start queuing up device commands on these ring buffers upon discovery of these channels and their locations. The commands may be processed by the kernel module 1022 as soon as they arrive.

For example, consider the scenario in which the runtime processor has loaded a plurality of configuration files for executing a plurality of user applications to the arrays of physical configurable units, whereby the number of user applications exceeds the number of arrays of physical configurable units in the pool of reconfigurable data flow resources (e.g., pool of reconfigurable data flow resources 678 of FIG. 6).

In this scenario, the kernel module 1022 may allocate a virtual set of the arrays of physical reconfigurable units to each user application. If desired, the user space graph processes may continuously transmit commands from the plurality of user applications for the kernel space through the command ring buffer, and the kernel module 1022 may dynamically allocate an available portion of the arrays of physical configurable units to process the commands. Thereby, the arrays of physical reconfigurable units in the pool of reconfigurable data flow resources may be over-subscribed efficiently. In other words, the pool of reconfigurable data flow resources may simultaneously execute a number of user applications that exceeds the number of arrays of physical reconfigurable units in the pool of reconfigurable data flow resources.

Figure 13:
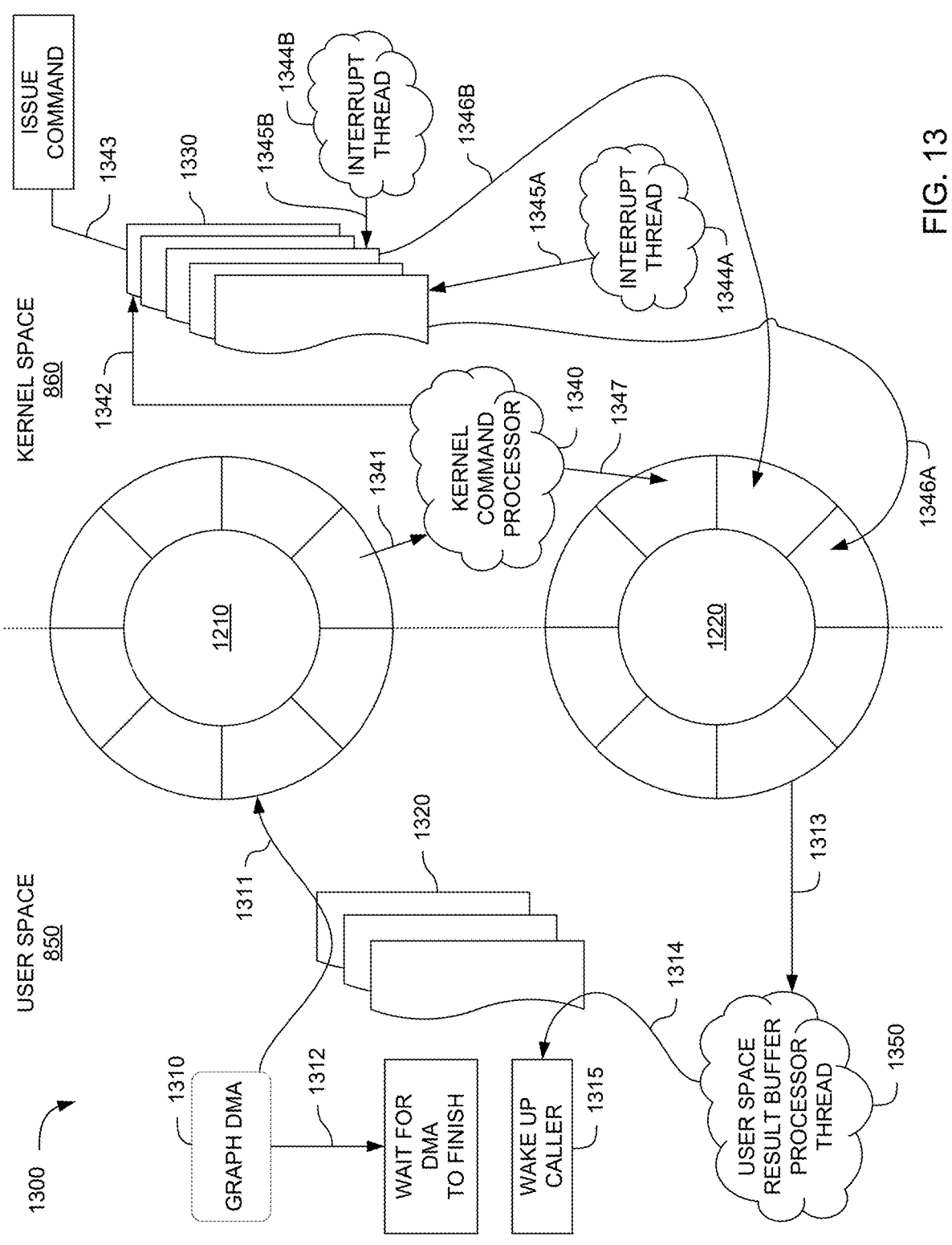
FIG. 13 is a diagram of an illustrative asynchronous command execution infrastructure between the user space and the kernel space of a runtime processor.

FIG. 13 is a diagram of an illustrative command execution infrastructure between the user space 850 and the kernel space 860 of a runtime processor 1300.

The command execution infrastructure handles the communication between the user space 850 and the kernel space 860 and may include a transmitter channel and a receiver channel. The transmitter channel may include a command ring buffer 1210 for communicating commands from the user space graph processes that are operating in the user space 850 to the kernel module that is operating kernel processes in the kernel space 860. The kernel module is sometimes also referred to as the kernel command processor 1340. The receiver channel may include a result ring buffer 1220 for communicating results from the kernel module to the user space graph processes. The user space graph processes may include a user space result buffer processor thread 1350.

The kernel command processor 1340 may dedicate a kernel worker thread for each command-result ring buffer pair 1210, 1220. The kernel worker thread may retrieve commands 1341 from the associated command ring buffer 1210. When the kernel worker thread retrieves a command for processing, validation logic (e.g., in the device driver of the kernel module) may validate the parameters of the command against what was assigned and allocated to the user space graph by referencing the resource manager in the kernel module. If validation passes, the device driver can access the components in the pool of reconfigurable data flow resources (e.g., for configuration of the CGR array). Thus, the kernel space 860 is configured to process the commands in response to the parameters of the commands passing the validation and to submit results from processing the commands in the result ring buffer 1220.

In some implementations, the components may be referenced by logical values. In these implementations, the device driver may translate the logical values to physical values (e.g., from logical unit identifier to physical unit identifier) before accessing the components in the pool of reconfigurable data flow resources. The device driver may then wait for the completion of the command by checking for the completion status from respective components. Once the command has completed, the device driver may add a corresponding status information to the result ring buffer 1220 of the specific result channel that corresponds to the command channel.

The user space result buffer processor thread 1350 may be polling for the status information in the result ring buffer 1220. Upon reception of the the status information, the user space result buffer processor thread 1350 can mark the operation to be completed.

As an example, consider the scenario in which a user space graph process places a DMA command in the command ring buffer (sometimes also referred to as a "command queue"), when requesting a DMA transfer (e.g., from the CGR array 120 of FIG. 1 to memory 190). Each DMA command may contain all the information that the kernel module (e.g., device driver 974 of kernel module 1022 of FIG. 10) uses to process a DMA transfer.

In some implementations, a DMA command may include a number of DMA transfer subcommands. For example, the DMA command may specify the DMA type (e.g. Direct DMA, scatter/gather DMA, or ring-based DMA). If desired, the DMA command may specify the DMA direction (e.g., host-to-device (H2D), device-to-host (D2H), or device-to-device (D2D), number of DMA subcommands), whether relax ordering is enabled, and/or a number of actual DMA subcommands. Each DMA subcommand uses the source and destination unit identifiers, source and destination DRAM addresses and length.

During a first operation 1311, the user space graph process may issue a DMA command 1310 that the user space graph process writes to the command ring buffer 1210. The user space graph process may then transition 1312 into a state in which the user space graph process waits for the DMA command to be executed.

During a second operation 1341, the kernel command processor 1340 may retrieve the DMA command from the command ring buffer 1210. The kernel command processor 1340 may add the DMA command to a buffer 1330 during a third operation 1342. The buffer 1330 may store the commands in an order by which the commands are executed. If desired, the kernel command processor 1340 may submit a timeout to the result ring buffer during operation 1347.

During a fourth operation 1343, the kernel module may use the resource manager to perform validation of the parameters of the DMA command. For example, the resource manager may validate the address which the DMA command intends to access against the addresses of the memory that was allocated to the corresponding user space graph. The DMA command may pass the validation only if the address specified in the DMA command lies within the address space of the memory that was allocated to the corresponding user space graph. In response to the parameters of the DMA command passing the validation, the kernel module may process the commands. For example, the device driver in the kernel module may issue the DMA command for execution and wait for the result to be written to a status register.

The device driver may poll the status registers during operations 1345A, 1345B and submit the results from processing the DMA command 1346A, 1346B to the result ring buffer 1220. If the DMA command accesses a comparatively large amount of data, the device driver may process the completion of the DMA command once a DMA interrupt is received 1344A, 1344B, in addition or instead of continually polling the status registers.

During operation 1346A, 1346B, the kernel module may place the results from the processing of the DMA command in the result ring buffer 1220. During operation 1313, the user space result buffer processor thread 1350 picks up the results from the result ring buffer 1220. The results may include information about the DMA command execution. For example, the results may include information about whether the DMA command was executed successfully, failed, or encountered a timeout.

In some implementations, the runtime processor (e.g., runtime processor 666 of FIG. 6) may include a channel manager. The channel manager may be configured to process results from the result ring buffer synchronously.

In the synchronous method, the user space result buffer processor thread 1350 may pull results directly from the result ring buffer 1220. The synchronous method may be used for channels where the commands are processed strictly in order by the kernel module, and the results accordingly are picked up by the user space result buffer processor thread 1350 in the same order in which the associated commands were submitted during operation 1311 to the command ring buffer 1210.

In other implementations, the channel may be configured to process results from the result ring buffer 1220 asynchronously. In the asynchronous method, the kernel module may process the commands from the command queue 1210 in a different order than the order in which the commands were submitted during operation 1311. For example, a user space graph process may submit two consecutive (and independent) DMA commands to two different arrays of physical configurable units in the pool of reconfigurable data flow resources. The first DMA command can involve a very large size of data, such that the DMA commands completes in milliseconds, whereas the second DMA command to a different array of the arrays of physical configurable units in the pool of reconfigurable data flow resources involves a small size of data such that the DMA command completes in mere microseconds. The kernel command processor 1340 can schedule both DMA operations in parallel, and deliver the results 1346A, 1346B in the order of completion, i.e. in an order different than the submission order.

Illustratively, the user space graph process may provide an index to a callback handler table 1320 with each command. If desired, the user space result buffer processor thread 1350 invokes the callback during operation 1314 when the result corresponding to the specific command arrives. For example, the user space result buffer processor thread 1350 may wait on a unique condition variable after submitting a DMA command. During operation 1315, the callback function may wake up the specific condition variable, signaling the completion of the DMA command. Thereby, the user space graph processes may omit any complex buffer management to correlated commands and results.

In some implementations, the user space graph process may go through a set of Finite State Machine (FSM) steps.

Figure 14:
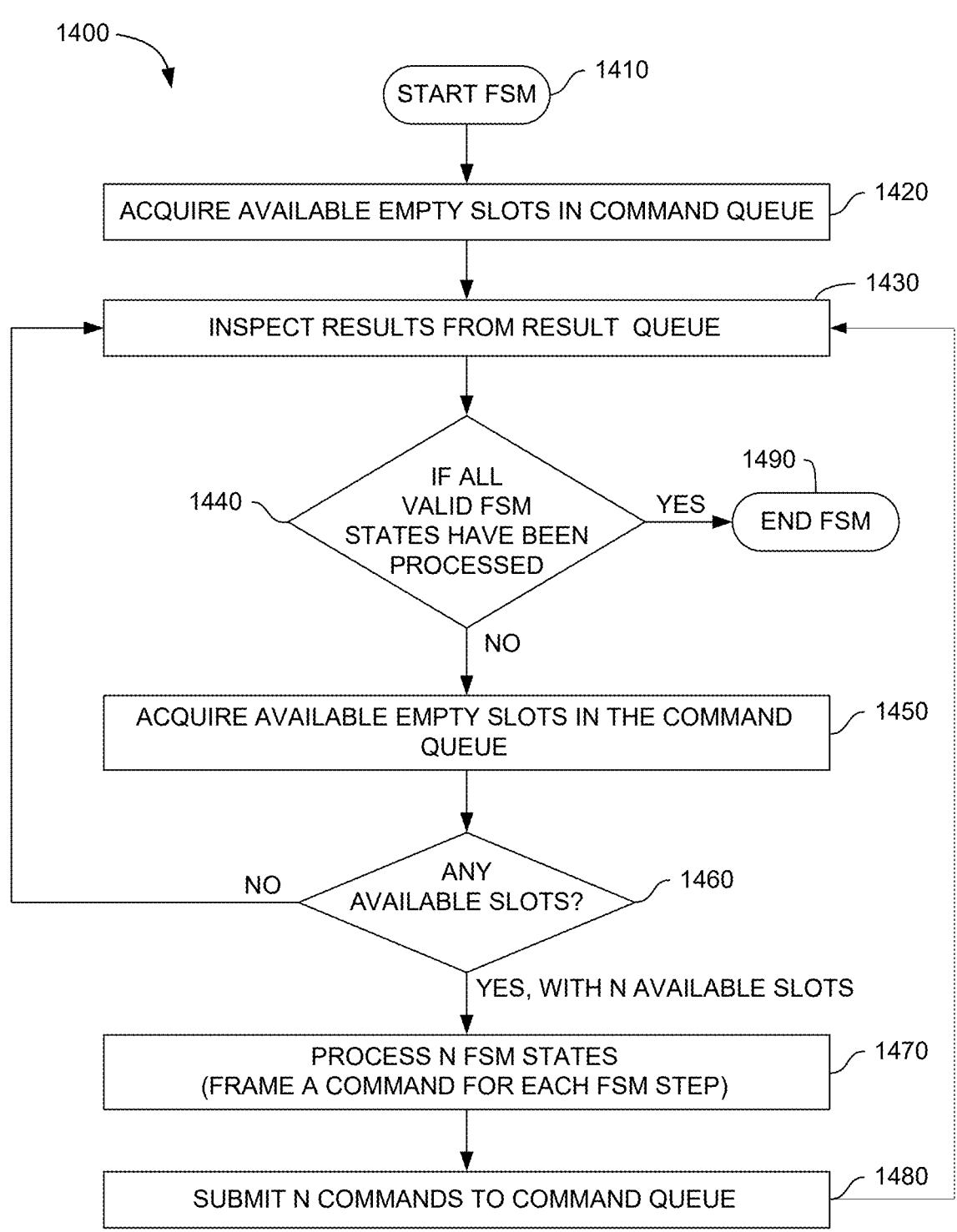
FIG. 14 is a diagram of a flowchart showing illustrative operations that a user space graph process in a runtime processor may perform for controlling program loading and execution on a pool of reconfigurable data flow resources.

FIG. 14 is a diagram of a flowchart 1400 showing illustrative operations that a user space graph process in a runtime processor may execute when submitting commands to the kernel module for execution.

The FSM may start with operation 1410. During operation 1420, the user space graph process may acquire available empty slots in the command queue. For example, the user space graph process may acquire available empty slots in the command ring buffer 1210 of FIG. 13.

During operation 1430, the user space graph process may inspect results from the results queue. For example, the users pace graph process may inspect results from the result ring buffer 1220 of FIG. 13.

During operation 1440, the user space graph process may determine if all valid FSM states have been processed. In response to determining that all valid FSM states have been processed, the user space graph process may end the FSM 1490.

In response to determining that not all valid FSM states have been processed, the user space graph process may acquire available empty slots in the command queue during operation 1450. During operation 1460, the user space graph process may determine if there are any available slots in the command queue. In response to determining that there are no available slots in the command queue, the user space graph process may return to operation 1430.

In response to determining that there are N available slots in the command queue, the user space graph process may process N FSM states during operation 1470. For example, the user space graph process may frame a command payload for each FSM step.

During operation 1480, the user space graph process may submit N commands to the command queue and return to operation 1430.

Graph control refers to the functionality by which a runtime processor (e.g., runtime processor 666 of FIG. 6) controls program loading and execution in a pool of reconfigurable data flow resources (e.g., pool of reconfigurable data flow resources 678 of FIG. 6). In some implementations, the runtime processor may go through a set of Finite State Machine (FSM) steps. Such a set of FSM steps may include program-load, argument-load, segment-load, program-execution, program-pause and program-unload. Some of these steps may be optional, and a programming file may have more than one section with all these steps.

Illustratively, the current section and FSM steps (program-load, argument-load etc.) may be encapsulated in a state profile. A loop may ask the state profile to provide the next section and step, until there are no more.

Figure 15:
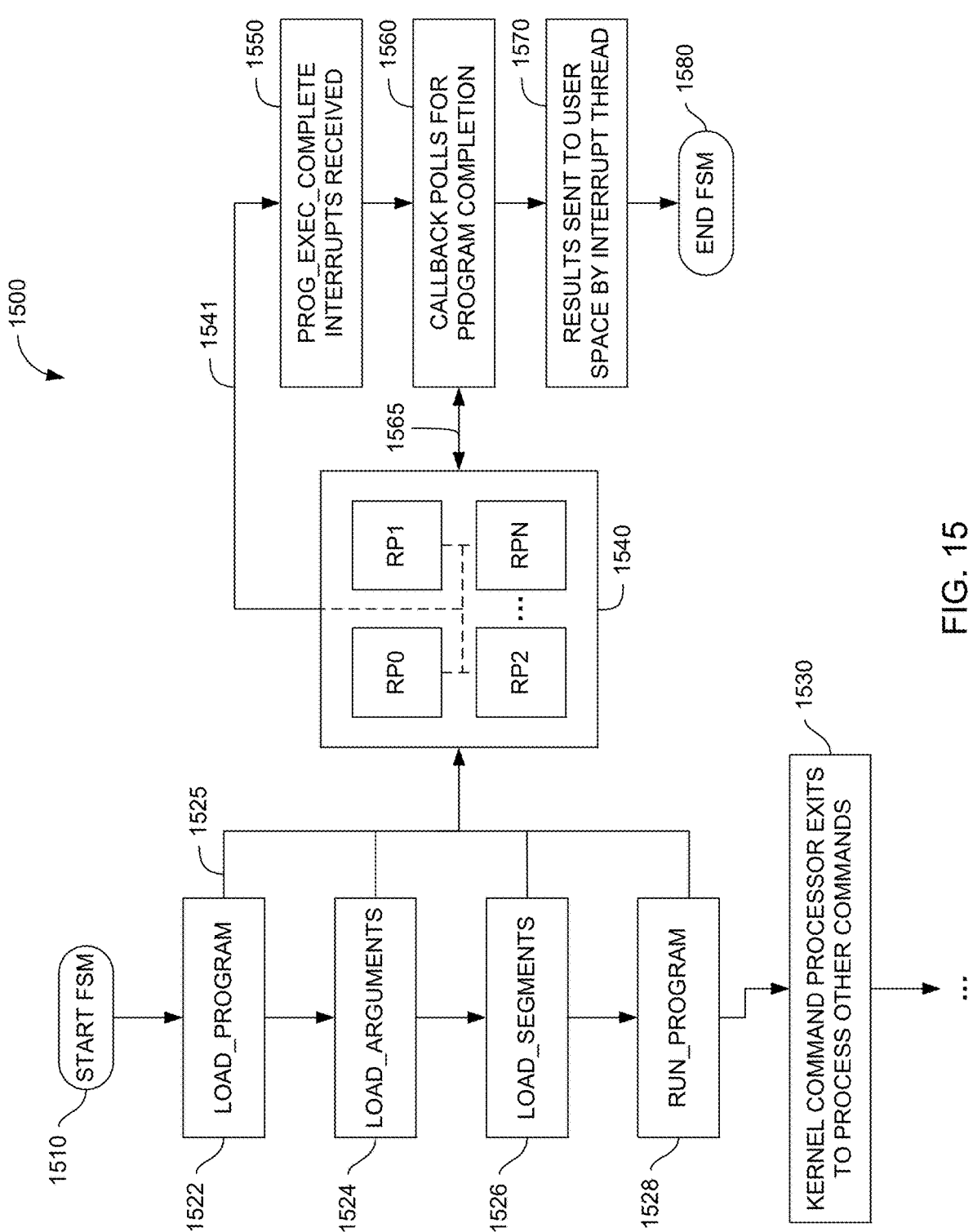
FIG. 15 is a diagram of a flowchart showing illustrative operations that a kernel module in a runtime processor may perform for controlling program loading and interrupt-based execution on a pool of reconfigurable data flow resources.

FIG. 15 is a diagram of a flowchart showing illustrative operations during the execution of an FSM 1500 that a kernel module of a runtime processor may perform for controlling program loading and interrupt-based execution on a pool of reconfigurable data flow resources 1540.

The FSM may start with operation 1510. During operation 1522, the kernel module may load the program and, during operation 1525, write the program to the pool of reconfigurable data flow resources 1540. The command payloads that are retrieved by the kernel module from the command ring buffer may include information about the target reconfigurable processors, tiles and AGCUs, as well as other data to be programmed on the respective hardware units. A dedicated kernel command processor thread may continuously poll for commands in the shared command buffer.

During operation 1524, the kernel module may load the arguments and, during operation 1525, write the arguments to the pool of reconfigurable data flow resources 1540. During operation 1526, the kernel module may load the segments and, during operation 1525, write the segments to the pool of reconfigurable data flow resources 1540. During operation 1528, the kernel module may run the program using the pool of reconfigurable data flow resources 1540. The kernel module may exit to process other commands during operation 1530.

The pool of reconfigurable data flow resources 1540 may issue interrupt requests 1541. If the pool of reconfigurable data flow resources 1540 issues the interrupt that the program execution has completed 1550, the callback may poll 1565 all memory units and arrays of physical configurable units in the pool of reconfigurable data flow resources 1540 for program completion during operation 1560. During operation 1570, an interrupt threads may send the results of the execution to the user space (e.g., via a result ring buffer), and the FSM may end 1580.

Insulating the graph control from any malicious behavior is of utmost importance. Illustratively, the basic unit of execution is a command payload that has all the information necessary to execute a certain step in a section in the graph.

Figure 16:
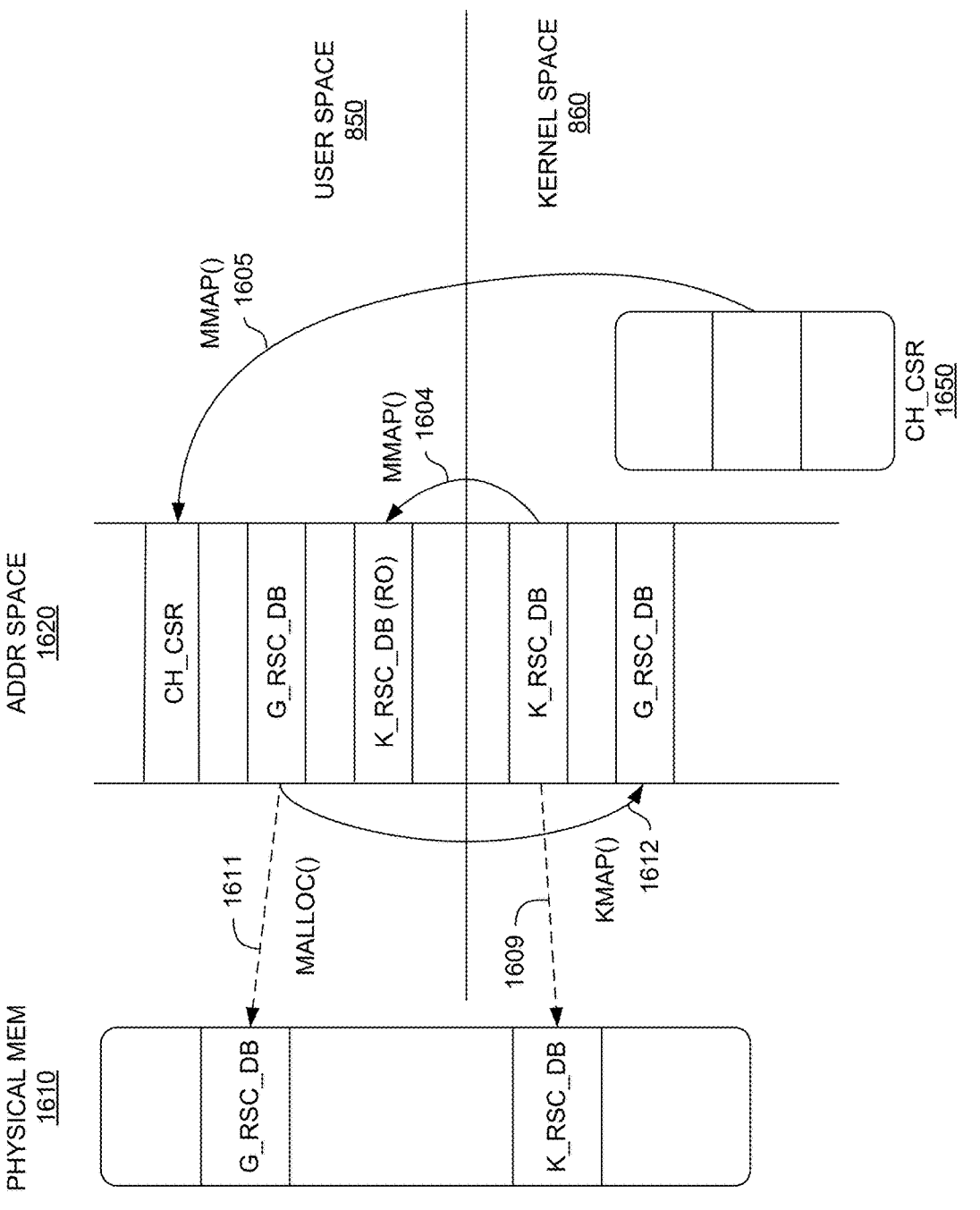
FIG. 16 is a diagram showing illustrative operations that a runtime processor may perform during resource allocation for establishing secure communication channels in the shared memory area between user space 850 and kernel space 860.

FIG. 16 is a diagram of a flowchart 1600 showing illustrative operations that a runtime processor may perform during resource allocation for establishing secure communication channels in the shared memory area 1610 between user space 850 and kernel space 860. The locations of these shared memory areas 1610 are propagated to the graph through the kernel resource data base (k_rsc_db). If desired, the kernel resource data base may include memory that is shared between the runtime library in the user space 850 and the resource manager in the kernel module in the kernel space 860. The kernel resource data base (k_rsc_db) in the kernel space 860 is mapped read-only to each graph as (k_rsc_db(RO)) in the user space 850.

Application requirements from a programming file are populated in the graph resource data base (g_rsc_db) and passed to the resource manager in the kernel module (k_rsc_db) during resource allocation requests. In order to protect fields updated by the resource manager in the kernel module (k_rsc_db), g_rsc_db is split into two blocks: Runtime library allocated shared memory which is populated by request from the programming file and a resource manager in the kernel module allocated shared memory where resource allocation is specified. The allocated shared memory in the resource manager of the kernel module is read-only for the runtime library. Illustratively, the following operations are executed:

During operation 1611, the runtime processor may allocate shared memory 1610 for the graph resources (g_rsc_db) with hardware resources 1650 used to execute the programming file.

During operation 1612, the graph resources (g_rsc_db) in the address space 1620 of the user space 850 are mapped into the address space 1620 of the kernel space 860. For example, the runtime processor may use a kmap memory mapping to map the graph resources (g_rsc_db) from the user space 850 into the kernel space 860.

Based on the graph resources (g_rsc_db), the resource manager in the kernel module allocates hardware resources. During operation 1603, the kernel module may also allocate memory for rsc_db (k_rsc_db) and update information of allocated resources in k_rsc_db. The kernel may mark this memory region read-only to protect it from applications modifying the shared memory region. It also returns the size of memory mapped hardware resources (e.g., by ioctl) for resource allocation.

During operation 1604, the user device manager may use an mmap memory mapping to map the kernel resource data base (k_rsc_db) in the address space 1620 of the kernel space 860 read-only to the address space 1620 in the user space 850 as k_rsc_db(RO). During operation 1605, the user device manager may use an mmap memory mapping to map hardware resources (e.g., the control and status register (CSR) space 1650) to the address space 1620 in the user space as ch_csr.

For most user graph operations, different command types with appropriate command arguments may be made available to the user graph. The commands may be modeled after the hardware abstraction layer (HAL) macros used to interact with the control and status registers (CSRs) in the pool of reconfigurable data flow resources. The commands may include address generation and control unit (AGCU) register interaction, memory interaction via DMA, and/or FIFO interaction, just to name a few.

For example, even though the AGCU registers are only accessible to the user graph that owns this portion of the reconfigurable data flow resources, the device memory addresses are programmed in the CSRs and must be validated by the validation logic in the kernel space. Examples of such HAL commands are set program load address, set program unload address, set argument table address, set argument table size, etc. In addition, there are other commands which do not need extra validation, (e.g., checking the status of the registers values for completion/failure), but may be exposed through commands as well.

DMA may use the DMA channel address as base. The validation logic must verify that the user graph owns the DMA channel, as also the device address and device range is being programmed, and FIFO register accesses mostly use host-memory addresses.

Based on the reconfigurable processor architecture (e.g., the segregation of the CSR space between the user space and the kernel space), other FSM flows are possible. For example, the kernel module may program the load/unload addresses. The user space then issues start program-load and waits until program-load is complete. The kernel module programs argument-load address/size, and the user space issues start argument-load and waits for argument-load to complete.

As another example, the FIFO programming (e.g., the setting of a FIFO's head and or tail accesses may be placed in the kernel space, such that the k_rsc_db may cross-check operations on the FIFO for veracity to prevent malicious users from compromising the hardware.

FIG. 17 is a diagram of a flowchart 1700 showing illustrative operations that a runtime processor may perform for executing two user applications on a pool of reconfigurable data flow resources in a data processing system. The pool of reconfigurable data flow resources (e.g., pool of reconfigurable resources 678 of FIG. 8) includes arrays of physical configurable units (e.g., CGR array 120 of FIG. 1), memory units located outside of the arrays of physical configurable units (e.g., memory 190 and/or memory 139 of FIG. 1), and busses (e.g., busses 185, 195, 130 of FIG. 1) coupled between the arrays of physical configurable units and the memory units. The runtime processor (e.g., runtime processor 666 of FIG. 8 that may be within host 180 of FIG. 1) is operatively coupled to the pool of reconfigurable data flow resources.

During operation 1710, the runtime processor loads a first configuration file for a first user application to a first subset of the arrays of physical configurable units in the pool of reconfigurable data flow resources.

During operation 1720, the runtime processor assigns a first subset of the memory units to the first user application.

During operation 1730, the runtime processor loads a second configuration file for a second user application to a second subset of the arrays of physical configurable units in the pool of reconfigurable data flow resources.

During operation 1740, the runtime processor assigns a second subset of the memory units to the second user application.

During operation 1750, the runtime processor executes the first and second user applications on the first and second subsets of the arrays of physical configurable units while preventing the first user application from accessing the second subset of the memory units and the second subset of the arrays of physical configurable units and preventing the second user application from accessing the first subset of the memory units and the first subset of the arrays of physical configurable units.

In some implementations, the runtime processor includes a user space and a kernel space. The runtime processor may prevent the first user application from accessing the second subset of the memory resources and the second subset of the arrays of physical configurable units and prevent the second user application from accessing the first subset of the memory resources and the first subset of the arrays of physical configurable units by limiting an execution of predetermined privileged operations on the pool of reconfigurable data flow resources to the kernel space.

Illustratively, in order to assist with limiting an execution of predetermined privileged operations on the pool of reconfigurable data flow resources to the kernel space, the runtime processor may track, in the kernel space, a first allocation of the first subset of the memory resources and the first subset of the arrays of physical configurable units to the first user application, and the runtime processor may track, in the kernel space, a second allocation of the second subset of the memory resources and the second subset of the arrays of physical configurable units to the second user application.

If desired, the runtime processor may transmit a command of the first user application from the user space to the kernel space and perform validation of the command of the first user application against the first and second allocations.

In some implementations, the runtime processor may process the command in the kernel space in response to the command passing the validation and transmit results from processing the command from the kernel space to the user space.

FIG. 18 is a diagram of a flowchart 1800 showing illustrative operations that a runtime processor (e.g., runtime processor 666 of FIG. 8) that includes a user space (e.g., user space 850 of FIG. 8) and a kernel space (e.g., kernel space 860 of FIG. 8) may perform for executing first and second user applications on respective first (e.g., RP1 and a portion of RP2 of FIG. 8) and second (e.g., another portion of RP2 and RP3 of FIG. 8)) subsets of a pool of reconfigurable data flow resources (e.g., pool of reconfigurable resources 678 of FIG. 8).

During operation 1810, the runtime processor submits a command of the first user application from the user space to the kernel space.

During operation 1820, the runtime processor uses the kernel space to initiate execution of the command of the first user application on the first subset of the pool of reconfigurable data flow resources while preventing the command of the first user application from accessing the second subset of the pool of reconfigurable data flow resources.

In some implementations, the runtime processor may store the command of the first user application in a ring buffer to assist with submitting the command of the first user application from the user space to the kernel space.

If desired, the runtime processor may report a result of the execution of the command of the first user application from the kernel space to the user space.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

Example 1 is a data processing system comprising a pool of reconfigurable data flow resources and a runtime processor that is operatively coupled to the pool of reconfigurable data flow resources. The pool of reconfigurable data flow resources comprises arrays of physical configurable units arranged in one or more reconfigurable processors, memory units located outside of the arrays of physical configurable units, and busses coupled between the memory units and the arrays of physical configurable units. The runtime processor is configured to: load a first configuration file for executing a first user application to a first subset of the arrays of physical configurable units in the pool of reconfigurable data flow resources, assign a first subset of the memory units to the first user application, load a second configuration file for executing a second user application to a second subset of the arrays of physical configurable units in the pool of reconfigurable data flow resources, assign a second subset of the memory units to the second user application, start execution of the first and second user applications on the first and second subsets of the arrays of physical configurable units, respectively, prevent the first user application from accessing the second subset of the memory units and the second subset of the arrays of physical configurable units, and prevent the second user application from accessing the first subset of the memory units and the first subset of the arrays of physical configurable units.

In Example 2, the arrays of physical configurable units of the one or more reconfigurable processors of Example 1 may optionally be aggregated as a uniform pool of resources that are assigned to the execution of the first and second user applications.

In Example 3, the busses of Example 1 may optionally include at least one of a Direct Memory Access (DMA) channel, a double data-rate (DDR) channel, a peripheral component interface express (PCIe) channel, an Ethernet channel, or an InfiniBand channel.

In Example 4, the memory units of Example 1 may optionally include at least one of a Dynamic Random-Access Memory (DRAM), a Hard Disk Drive (HDD), a Solid-State Drive (SSD), a distributed file system, or a web server.

In Example 5, the runtime processor of Example 1 may optionally include a user space and a kernel space. The kernel space may be exclusively authorized to execute predetermined privileged operations on the pool of reconfigurable data flow resources.

In Example 6, the pool of reconfigurable data flow resources of Example 5 may optionally include configuration registers for configuring the arrays of physical configurable units, and the predetermined privileged operations may optionally include operations that access the configuration registers.

In Example 7, the kernel space of Example 5 may optionally include a resource manager that is configured to track a first allocation of the first subset of the memory units and the first subset of the arrays of physical configurable units to the first user application and a second allocation of the second subset of the memory units and the second subset of the arrays of physical configurable units to the second user application.

In Example 8, the runtime processor of Example 7 may further optionally include first and second channels between the user space and the kernel space, wherein the user space is configured to transmit commands for the kernel space through the first channel, and wherein the kernel space is configured to transmit results to the user space through the second channel.

In Example 9, the first channel of Example 8 may optionally include a first ring buffer, and the second channel may include a second ring buffer.

In Example 10, the arrays of physical configurable units are configured to implement the first and second ring buffers of Example 9.

In Example 11, the arrays of physical configurable units are further configured to retrieve the commands from the first ring buffer of Example 10, to perform validation of parameters of the commands against the first and second allocations, to process the commands in response to the parameters of the commands passing the validation, and to submit results from processing the commands in the second ring buffer of Example 10.

In Example 12, the pool of reconfigurable data flow resources further comprises a network interface card that couples at least two of the arrays of physical configurable units arranged in at least two different reconfigurable processors, and wherein the network interface card is configured to implement the first and second ring buffers of Example 9.

In Example 13, the runtime processor of Example 9 may further optionally include a channel manager that is configured to find a next free slot in the first ring buffer for submitting a new command, and to notify the kernel space that the new command has been added to the first ring buffer.

In Example 14, the channel manager of Example 13 may optionally increment a tail pointer of the first ring buffer to notify the kernel space that the new command has been added to the first ring buffer.

In Example 15, the kernel space of Example 9 may optionally be configured to retrieve the commands from the first ring buffer and to use the resource manager to perform validation of parameters of the commands against the first and second allocations.

In Example 16, the kernel space of Example 15 may optionally be configured to process the commands in response to the parameters of the commands passing the validation and to submit results from processing the commands in the second ring buffer.

In Example 17, the runtime processor of Example 16 may further optionally include a channel manager that is configured to process results from the second ring buffer synchronously.

In Example 18, the runtime processor of Example 16 may optionally include a channel manager that is configured to process results from the second ring buffer asynchronously.

In Example 19, the runtime processor may be configured to load a plurality of additional configuration file for executing a plurality of additional user applications to the arrays of physical configurable units, wherein the user space is configured to transmit commands from the plurality of addi-tional user applications for the kernel space through the first channel of Example 9, and wherein the kernel space is configured to allocate at least a portion of the first subset of the arrays of physical configurable units to process the commands.

Example 20 is a method of operating a data processing system. The data processing system includes a pool of reconfigurable data flow resources that optionally includes arrays of physical configurable units, memory units located outside of the arrays of physical configurable units, and busses coupled between the arrays of physical configurable units and the memory units; and a runtime processor that is operatively coupled to the pool of reconfigurable data flow resources. The method optionally includes loading a first configuration file for a first user application to a first subset of the arrays of physical configurable units in the pool of reconfigurable data flow resources; assigning a first subset of the memory units to the first user application; loading a second configuration file for a second user application to a second subset of the arrays of physical configurable units in the pool of reconfigurable data flow resources; assigning a second subset of the memory units to the second user application; and executing the first and second user appli-cations on the first and second subsets of the memory units and on the first and second subsets of the arrays of physical configurable units while preventing the first user application from accessing the second subset of the memory units and the second subset of the arrays of physical configurable units and preventing the second user application from accessing the first subset of the memory units and the first subset of the arrays of physical configurable units.

In Example 21, the runtime processor of Example 20 may optionally include a user space and a kernel space, and preventing the first user application from accessing the second subset of the memory units and the second subset of the arrays of physical configurable units and preventing the second user application from accessing the first subset of the memory units and the first subset of the arrays of physical configurable units may further optionally include limiting an execution of predetermined privileged operations on the pool of reconfigurable data flow resources to the kernel space.

In Example 22, limiting an execution of predetermined privileged operations on the pool of reconfigurable data flow resources to the kernel space of Example 21 may further optionally include tracking, in the kernel space, a first allocation of the first subset of the memory units and the first subset of the arrays of physical configurable units to the first user application; and tracking, in the kernel space, a second allocation of the second subset of the memory units and the second subset of the arrays of physical configurable units to the second user application.

In Example 23, the method of Example 22 may further optionally include transmitting a command of the first user application from the user space to the kernel space; and performing validation of the command of the first user application against the first and second allocations.

In Example 24, the method of Example 23 may further optionally include processing the command in the kernel space in response to the command passing the validation; and transmitting results from processing the command from the kernel space to the user space.

Example 25 is a method of operating a runtime processor that includes a user space and a kernel space for executing first and second user applications on respective first and second subsets of a pool of reconfigurable data flow resources. The method includes submitting a command of the first user application from the user space to the kernel space; and using the kernel space to initiate execution of the command of the first user application on the first subset of the pool of reconfigurable data flow resources while preventing the command of the first user application from accessing the second subset of the pool of reconfigurable data flow resources.

In Example 26, submitting the command of the first user application from the user space to the kernel space of Example 25 may optionally include storing the command of the first user application in a ring buffer.

In Example 27, the method of Example 26 may optionally include reporting a result of the execution of the command of the first user application from the kernel space to the user space.

What is claimed is:

1. A data processing system, comprising:
a pool of reconfigurable compute and memory resources, comprising:
arrays of configurable compute and memory units arranged in one or more reconfigurable processors, wherein the configurable compute and memory units comprise reconfigurable datapath elements having programmable interconnections and configurable logic functions, and wherein computational operations performed by the reconfigurable datapath elements are defined by configuration data loaded from configuration files,
memory units located outside of the arrays of configurable compute and memory units, and busses coupled between the memory units and the arrays of configurable compute and memory units; and
a runtime processor, comprising a user space and a kernel space, wherein the kernel space is exclusively authorized to execute predetermined privileged operations on the pool of reconfigurable compute and memory resources, and further comprises first and second channels, implemented by the arrays of configurable compute and memory units, between the user space and the kernel space, wherein the user space is configured to transmit commands for the kernel space through the first channel, and wherein the kernel space is configured to transmit results to the user space through the second channel, operatively coupled to the pool of reconfigurable compute and memory resources and configured to:
load a first configuration file comprising first configuration data that defines first computational operations to be performed by the reconfigurable datapath elements for executing a first user application to a first subset of the arrays of configurable compute and memory units in the pool of reconfigurable compute and memory resources,
assign a first subset of the memory units to the first user application,
load a second configuration file comprising second configuration data that defines second computational operations to be performed by the reconfigurable datapath elements for executing a second user application to a second subset of the arrays of configurable compute and memory units in the pool of reconfigurable compute and memory resources,
assign a second subset of the memory units to the second user application, start execution of the first and second user applications on the first and second subsets of the arrays of configurable compute and memory units, respectively,
wherein the kernel space further comprises a resource manager that is configured to track, during execution, a first allocation of the first subset of the memory units and the first subset of the arrays of physical configurable units to the first user application and a second allocation of the second subset of the memory units and the second subset of the arrays of configurable compute and memory units to the second user application;
and wherein the arrays of configurable compute and memory units are further configured, duration execution, to retrieve the commands from the first channel, to perform validation of parameters of the commands against the first and second allocations, to process the commands in response to the parameters of the commands passing the validation, and to submit results from processing the commands to the second channel.

2. The data processing system of claim 1, wherein the arrays of configurable compute and memory units of the one or more reconfigurable processors are aggregated as a uniform pool of resources that are assigned to the execution of the first and second user applications.

3. The data processing system of claim 1, wherein the busses comprise at least one of a Direct Memory Access (DMA) channel, a double data-rate (DDR) channel, a peripheral component interface express (PCIe) channel, an Ethernet channel, or an InfiniBand channel.

4. The data processing system of claim 1, wherein the memory units comprise at least one of a Dynamic Random-Access Memory (DRAM), a Hard Disk Drive (HDD), a Solid-State Drive (SSD), a distributed file system, or a web server.

5. The data processing system of claim 1, wherein the pool of reconfigurable compute and memory resources further comprises configuration registers for configuring the arrays of configurable compute and memory units, and wherein the predetermined privileged operations comprise operations that access the configuration registers.

6. The data processing system of claim 1, wherein the first channel comprises a first ring buffer, and wherein the second channel comprises a second ring buffer.

7. The data processing system of claim 6, wherein the arrays of configurable compute and memory units are configured to implement the first and second ring buffers.

8. The data processing system of claim 7, wherein the arrays of configurable compute and memory units are further configured to retrieve the commands from the first ring buffer, to perform validation of parameters of the commands against the first and second allocations, to process the commands in response to the parameters of the commands passing the validation, and to submit results from processing the commands to the second ring buffer.

9. The data processing system of claim 6, wherein the pool of reconfigurable compute and memory resources further comprises: a network interface card that couples at least two of the arrays of configurable compute and memory units arranged in at least two different reconfigurable processors, and wherein the network interface card is configured to implement the first and second ring buffers.

10. The data processing system of claim 6, wherein the runtime processor further comprises a channel manager that is configured to find a next free slot in the first ring buffer for submitting a new command, and to notify the kernel space that the new command has been added to the first ring buffer.

11. The data processing system of claim 10, wherein the channel manager increments a tail pointer of the first ring buffer to notify the kernel space that the new command has been added to the first ring buffer.

12. The data processing system of claim 6, wherein the kernel space is further configured to retrieve the commands from the first ring buffer and to use the resource manager to perform validation of parameters of the commands against the first and second allocations.

13. The data processing system of claim 12, wherein the kernel space is further configured to process the commands in response to the parameters of the commands passing the validation and to submit results from processing the commands in the second ring buffer.

14. The data processing system of claim 13, wherein the runtime processor further comprises a channel manager that is configured to process results from the second ring buffer synchronously.

15. The data processing system of claim 13, wherein the runtime processor further comprises a channel manager that is configured to process results from the second ring buffer asynchronously.

16. The data processing system of claim 6, wherein the runtime processor is further configured to load a plurality of additional configuration file for executing a plurality of additional user applications to the arrays of configurable compute and memory units, wherein the user space is configured to transmit commands from the plurality of additional user applications for the kernel space through the first channel, and wherein the kernel space is configured to allocate at least a portion of the first subset of the arrays of configurable compute and memory units to process the commands.

17. A method of operating a data processing system including a pool of reconfigurable compute and memory resources that comprises arrays of configurable compute and memory units having reconfigurable datapath elements with programmable interconnections and configurable logic functions, and wherein computational operations performed by the reconfigurable datapath elements are defined by configuration data loaded from configuration files, memory units located outside of the arrays of configurable compute and memory units, and busses coupled between the arrays of configurable compute and memory units and the memory units; and a runtime processor, comprising a user space and a kernel space, wherein the kernel space is exclusively authorized to execute predetermined privileged operations on the pool of reconfigurable compute and memory resources, and further comprises first and second channels, implemented by the arrays of configurable compute and memory units, between the user space and the kernel space, wherein the user space is configured to transmit commands for the kernel space through the first channel, and wherein the kernel space is configured to transmit results to the user space through the second channel, that is operatively coupled to the pool of reconfigurable compute and memory resources, the method comprising:

loading a first configuration file comprising first configuration data that defines first computational operations to be performed by the reconfigurable datapath elements for a first user application to a first subset of the arrays of configurable compute and memory units in the pool of reconfigurable compute and memory resources;

assigning a first subset of the memory units to the first user application;

loading a second configuration file comprising second configuration data that defines second computational operations to be performed by the reconfigurable datapath elements for a second user application to a second subset of the arrays of configurable compute and memory units in the pool of reconfigurable compute and memory resources;

assigning a second subset of the memory units to the second user application; and executing the first and second user applications on the first and second subsets of the arrays of configurable compute and memory units, respectively, wherein the kernel space further comprises a resource manager that is configured to track, during execution, a first allocation of the first subset of the memory units and the first subset of the arrays of physical configurable units to the first user application and a second allocation of the second subset of the memory units and the second subset of the arrays of configurable compute and memory units to the second user application;

and wherein the arrays of configurable compute and memory units are further configured, during execution, to retrieve the commands from the first channel, to perform validation of parameters of the commands against the first and second allocations, to process the commands in response to the parameters of the commands passing the validation, and to submit results from processing the commands to the second channel.

18. The method of claim 17, further comprising: transmitting a command of the first user application from the user space to the kernel space; and performing validation of the command of the first user application against the first and second allocations.

19. The method of claim 18, further comprising: processing the command in the kernel space in response to the command passing the validation; and transmitting results from processing the command from the kernel space to the user space.

\* \* \* \* \*